United States Patent
Iwanaga et al.

(10) Patent No.: US 10,995,184 B2
(45) Date of Patent: May 4, 2021

(54) SOL COMPOSITION, AEROGEL COMPOSITE, SUPPORT MEMBER PROVIDED WITH AEROGEL COMPOSITE, AND HEAT INSULATOR

(71) Applicant: HITACHI CHEMICAL COMPANY, LTD., Tokyo (JP)

(72) Inventors: Kouta Iwanaga, Tokyo (JP); Tomohiko Kotake, Tokyo (JP); Tatsuya Makino, Tokyo (JP); Masato Miyatake, Tokyo (JP); Satoshi Takayasu, Tokyo (JP)

(73) Assignee: SHOW A DENKO MATERIALS CO., LTD., Tokyo (JP)

( * ) Notice: Subject to any disclaimer, the term of this patent is extended or adjusted under 35 U.S.C. 154(b) by 140 days.

(21) Appl. No.: 16/087,408

(22) PCT Filed: Mar. 21, 2017

(86) PCT No.: PCT/JP2017/011259
§ 371 (c)(1),
(2) Date: Sep. 21, 2018

(87) PCT Pub. No.: WO2017/164184
PCT Pub. Date: Sep. 28, 2017

(65) Prior Publication Data
US 2019/0100630 A1 Apr. 4, 2019

(30) Foreign Application Priority Data

Mar. 25, 2016 (JP) .............................. JP2016-061347
Mar. 25, 2016 (JP) .............................. JP2016-061349

(51) Int. Cl.
| | | |
|---|---|---|
| C08J 3/075 | (2006.01) | |
| C08J 9/28 | (2006.01) | |
| C08K 3/36 | (2006.01) | |
| C08L 83/04 | (2006.01) | |
| B32B 9/00 | (2006.01) | |
| C01B 33/158 | (2006.01) | |
| C01B 33/141 | (2006.01) | |
| C08J 9/00 | (2006.01) | |
| B01J 13/00 | (2006.01) | |
| C08G 77/18 | (2006.01) | |

(52) U.S. Cl.
CPC ........... *C08J 3/075* (2013.01); *B01J 13/0021* (2013.01); *B01J 13/0091* (2013.01); *B32B 9/00* (2013.01); *C01B 33/141* (2013.01); *C01B 33/1585* (2013.01); *C08J 9/0066* (2013.01); *C08J 9/28* (2013.01); *C08K 3/36* (2013.01); *C08L 83/04* (2013.01); *C01P 2004/62* (2013.01); *C01P 2004/64* (2013.01); *C01P 2006/12* (2013.01); *C08G 77/18* (2013.01); *C08J 2201/05* (2013.01); *C08J 2201/054* (2013.01); *C08J 2205/026* (2013.01); *C08J 2383/04* (2013.01); *C08K 2201/003* (2013.01); *C08K 2201/006* (2013.01)

(58) Field of Classification Search
CPC ... C08J 3/075; C08J 9/28; C08J 9/0066; C08J 2201/05; C08J 2201/054; C08J 2205/026; C08J 2383/04; C08K 3/36; C08K 2201/003; C08K 2201/006; C08L 83/04; B32B 9/00; B01J 13/0021; B01J 13/0091; C08G 77/18; C01B 33/1585; C01B 33/141; C01P 2004/64; C01P 2004/62; C01P 2006/12
See application file for complete search history.

(56) References Cited

U.S. PATENT DOCUMENTS

| | | | |
|---|---|---|---|
| 4,402,927 A | 9/1983 | von Dardel | |
| 5,098,938 A * | 3/1992 | Savin | C09D 5/10 523/220 |
| 5,207,814 A * | 5/1993 | Cogliati | B01J 13/0091 501/12 |
| 5,709,975 A * | 1/1998 | Yoerger | G03G 9/1136 430/111.33 |
| 6,495,253 B1 * | 12/2002 | Koyama | B32B 27/08 428/343 |
| 10,590,001 B2 * | 3/2020 | Kotake | C08G 77/04 |
| 2004/0253427 A1 * | 12/2004 | Yokogawa | G02B 5/0278 428/212 |
| 2011/0224117 A1 * | 9/2011 | Mitsuishi | B41J 2/16552 510/170 |
| 2012/0052435 A1 * | 3/2012 | Anazawa | G03G 9/1075 430/111.35 |
| 2013/0161059 A1 * | 6/2013 | Steffl | C08L 23/0853 174/105 SC |
| 2015/0118501 A1 * | 4/2015 | Lu | C09D 175/04 428/424.6 |

(Continued)

FOREIGN PATENT DOCUMENTS

| | | |
|---|---|---|
| JP | H2-248335 A | 10/1990 |
| JP | H7-196311 A | 8/1995 |

(Continued)

*Primary Examiner* — Patrick D Niland
(74) *Attorney, Agent, or Firm* — Fitch Even Tabin & Flannery LLP

(57) ABSTRACT

The present invention relates to a sol composition for forming an aerogel composite, wherein the sol composition is a sol composition with a sufficient pot life for forming an aerogel composite superior in thermal insulation and flexibility, and comprises: at least one selected from the group consisting of a silicon compound having a hydrolyzable functional group or a condensable functional group and a hydrolysis product of the silicon compound having a hydrolyzable functional group; and a silica particle having an average primary particle diameter of 5 to 300 nm or a specific surface area of 10 to 600 m$^2$/g.

20 Claims, 2 Drawing Sheets

(56) References Cited

U.S. PATENT DOCUMENTS

| | | | |
|---|---|---|---|
| 2015/0279505 A1* | 10/2015 | Omori | C09D 11/52 |
| | | | 427/553 |
| 2018/0250913 A1* | 9/2018 | Kotake | B32B 5/028 |
| 2018/0327609 A1* | 11/2018 | Makino | C09D 5/18 |
| 2019/0030873 A1* | 1/2019 | Takayasu | B32B 27/283 |
| 2019/0119494 A1* | 4/2019 | Makino | C08K 3/36 |
| 2019/0263089 A1* | 8/2019 | Kotake | E04B 1/806 |

FOREIGN PATENT DOCUMENTS

| | | |
|---|---|---|
| JP | H8-300567 A | 11/1996 |
| JP | 2000-026609 A | 1/2000 |
| JP | 2000-129127 A | 5/2000 |
| JP | 2006-021953 A | 1/2006 |
| JP | 2010-502554 A | 1/2010 |
| JP | 2011-093744 A | 5/2011 |
| JP | 2012-233110 A | 11/2012 |
| JP | 5250900 B | 7/2013 |
| TW | 201536905 A | 10/2015 |
| WO | 2015/129736 A1 | 9/2015 |
| WO | 2017/038646 A1 | 3/2017 |
| WO | 2017/038777 A1 | 3/2017 |

* cited by examiner

SOL COMPOSITION, AEROGEL COMPOSITE, SUPPORT MEMBER PROVIDED WITH AEROGEL COMPOSITE, AND HEAT INSULATOR

CROSS-REFERENCE TO RELATED APPLICATIONS

This application is a U.S. national phase application filed under 35 U.S.C. § 371 of International Application No. PCT/JP2017/011259, filed Mar. 21, 2017, designating the United States, which claims priority from Japanese Patent Application No. 2016-061347, filed Mar. 25, 2016, and Japanese Patent Application No. 2016-061349, filed Mar. 25, 2016, which are hereby incorporated herein by reference in their entirety.

TECHNICAL FIELD

The present disclosure relates to a sol composition, an aerogel composite, a support member provided with an aerogel composite, and a heat insulator.

BACKGROUND ART

Silica aerogels are known as materials having thermal insulation with low thermal conductivity. Silica aerogels are useful as functional raw materials with superior functionality (e.g., thermal insulation), unique optical properties, unique electric properties, etc., and used for, for example, materials for electronic substrates, which utilize the property of an ultralow dielectric constant of a silica aerogel, thermal insulation materials, which utilize the high thermal insulation of a silica aerogel, and light reflective materials, which utilize the ultralow refractive index of a silica aerogel.

Supercritical drying is known as a method for producing such a silica aerogel, in which a gel compound (alcogel) obtained by hydrolyzing and polymerizing an alkoxysilane is dried under supercritical conditions for a dispersion medium (e.g., see Patent Literature 1). Supercritical drying is a method in which an alcogel and a dispersion medium (a solvent used for drying) are introduced into a high-pressure container, and a temperature and pressure equal to or higher than the critical point of the dispersion medium is applied to the dispersion medium to convert it into a supercritical fluid, thereby removing the solvent contained in the alcogel. However, supercritical drying requires a high-pressure process, and hence needs capital investment for special apparatuses or the like capable of enduring supercritical condition, as well as much time and effort.

In view of this, techniques of drying an alcogel with a versatile method without need of any high-pressure process have been proposed. A known example of such a method is a method in which monoalkyltrialkoxysilane and tetraalkoxysilane are used in combination with a specific ratio as gel materials to enhance the strength of the resulting alcogel, and the alcogel is dried under ambient pressure (e.g., see Patent Literature 2). When such ambient pressure drying is employed, however, the gel tends to shrink because of a stress caused by capillary force in the inside of the alcogel.

CITATION LIST

Patent Literature

Patent Literature 1: U.S. Pat. No. 4,402,927
Patent Literature 2: Japanese Unexamined Patent Publication No. 2011-93744

SUMMARY OF INVENTION

Technical Problem

Although attempts have been made from various viewpoints to overcome problems inherent in conventional production processes as described above, aerogels produced with any of the processes have poor handleability, and the processes have difficulty in production of large aerogels and hence have disadvantages in productivity. For example, a lump of an aerogel obtained with any of the processes may be broken only by a touch to scoop up. The reason is probably that the density of the aerogel is low and that the aerogel has a porous structure in which fine particles with a size of around 10 nm are only weakly linked together.

A method of imparting flexibility to a gel through increase of the pore diameter of the gel to the order of micrometers is contemplated as a technique to solve such a problem inherent in conventional aerogels. However, aerogels produced with such a method suffer from a problem of significantly increased thermal conductivity, resulting in loss of the excellent thermal insulation of aerogels.

In addition, a method of drying a particular wet gel to obtain an aerogel has been examined and found to have a problem of shortness of the pot life of sol, a raw material to prepare wet gel.

The present disclosure was made in consideration of the above-described circumstances, and an object of the present disclosure is to provide a sol composition with a sufficient pot life for forming an aerogel composite superior in thermal insulation and flexibility, and an aerogel composite. Another object of the present disclosure is to provide a support member provided with an aerogel composite, the support member supporting the above aerogel composite, and a heat insulator.

Solution to Problem

The present disclosure provides a sol composition for forming an aerogel composite, the sol composition comprising: at least one selected from the group consisting of a silicon compound having a hydrolyzable functional group or a condensable functional group and a hydrolysis product of the silicon compound having a hydrolyzable functional group; and a silica particle having an average primary particle diameter of 5 to 300 nm.

The present disclosure further provides a sol composition for forming an aerogel composite, the sol composition comprising: at least one selected from the group consisting of a silicon compound having a hydrolyzable functional group or a condensable functional group and a hydrolysis product of the silicon compound having a hydrolyzable functional group; and a silica particle having a specific surface area of 10 to 600 m²/g.

In the present disclosure, the silicon compound can further comprise a polysiloxane compound having a hydrolyzable functional group or a condensable functional group.

In the present disclosure, the polysiloxane compound may include a compound having a structure represented by the following formula (B):

[Chemical Formula 1]

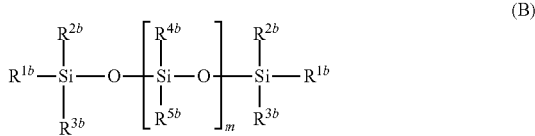

(B)

wherein $R^{1b}$ represents an alkyl group, an alkoxy group, or an aryl group; $R^{2b}$ and $R^{3b}$ each independently represent an alkoxy group; $R^{1b}$ and $R^{5b}$ each independently represent an alkyl group or an aryl group; and m represents an integer of 1 to 50.

The present disclosure provides an aerogel composite as a dried product of a wet gel, wherein the wet gel is a condensate of the sol composition.

The present disclosure provides an aerogel composite comprising an aerogel component and a silica particle having an average primary particle diameter of 5 to 300 nm.

The present disclosure provides an aerogel composite comprising an aerogel component and a silica particle having a specific surface area of 10 to 600 m²/g.

In the present disclosure, the aerogel composite can have: a three-dimensional network skeleton formed of the aerogel component and the silica particle; and a pore.

In the present disclosure, the silica particle can be an amorphous silica particle.

In the present disclosure, the aerogel composite can have a ladder-type structure including struts and a bridge, wherein the bridge has a structure represented by the following formula (2):

[Chemical Formula 2]

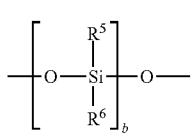

(2)

wherein $R^5$ and $R^6$ each independently represent an alkyl group or an aryl group; and b represents an integer of 1 to 50.

In the present disclosure, the aerogel composite can have a ladder-type structure represented by the following formula (3):

[Chemical Formula 3]

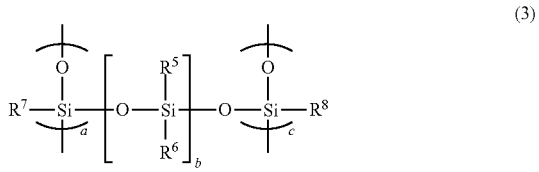

(3)

wherein $R^5$, $R^6$, $R^7$, and $R^8$ each independently represent an alkyl group or an aryl group; a and c each independently represent an integer of 1 to 3000; and b represents an integer of 1 to 50.

The present disclosure provides a support member provided with an aerogel composite, the support member comprising: the aerogel composite; and a support member supporting the aerogel composite.

The present disclosure provides a heat insulator comprising the aerogel composite.

Advantageous Effects of Invention

The present disclosure can provide a sol composition with a sufficient pot life for forming an aerogel composite superior in thermal insulation and flexibility, and an aerogel composite. Specifically, the present disclosure can provide an aerogel composite which exhibits superior thermal insulation, as well as improved handleability, which allows production of a larger aerogel composite and hence improvement of the productivity. The aerogel composite, which is superior in thermal insulation and flexibility as described above, has potential utility for a wide variety of applications. In addition, the present disclosure can provide a support member provided with an aerogel composite, the support member supporting the above aerogel composite, and a heat insulator. Here, an important point of the present disclosure is that the thermal insulation and flexibility can be controlled more easily than those of conventional aerogels. This is a matter which conventional aerogels have not achieved, because conventional aerogels need to sacrifice the thermal insulation for flexibility or to sacrifice the flexibility for thermal insulation. The phrase "superior in thermal insulation and flexibility" does not necessarily mean that numerical values as indicators of the two properties are both large, and encompasses, for example, "superior in flexibility with the thermal insulation satisfactorily maintained" and "superior in thermal insulation with the flexibility satisfactorily maintained".

DESCRIPTION OF EMBODIMENTS

Figure 1:
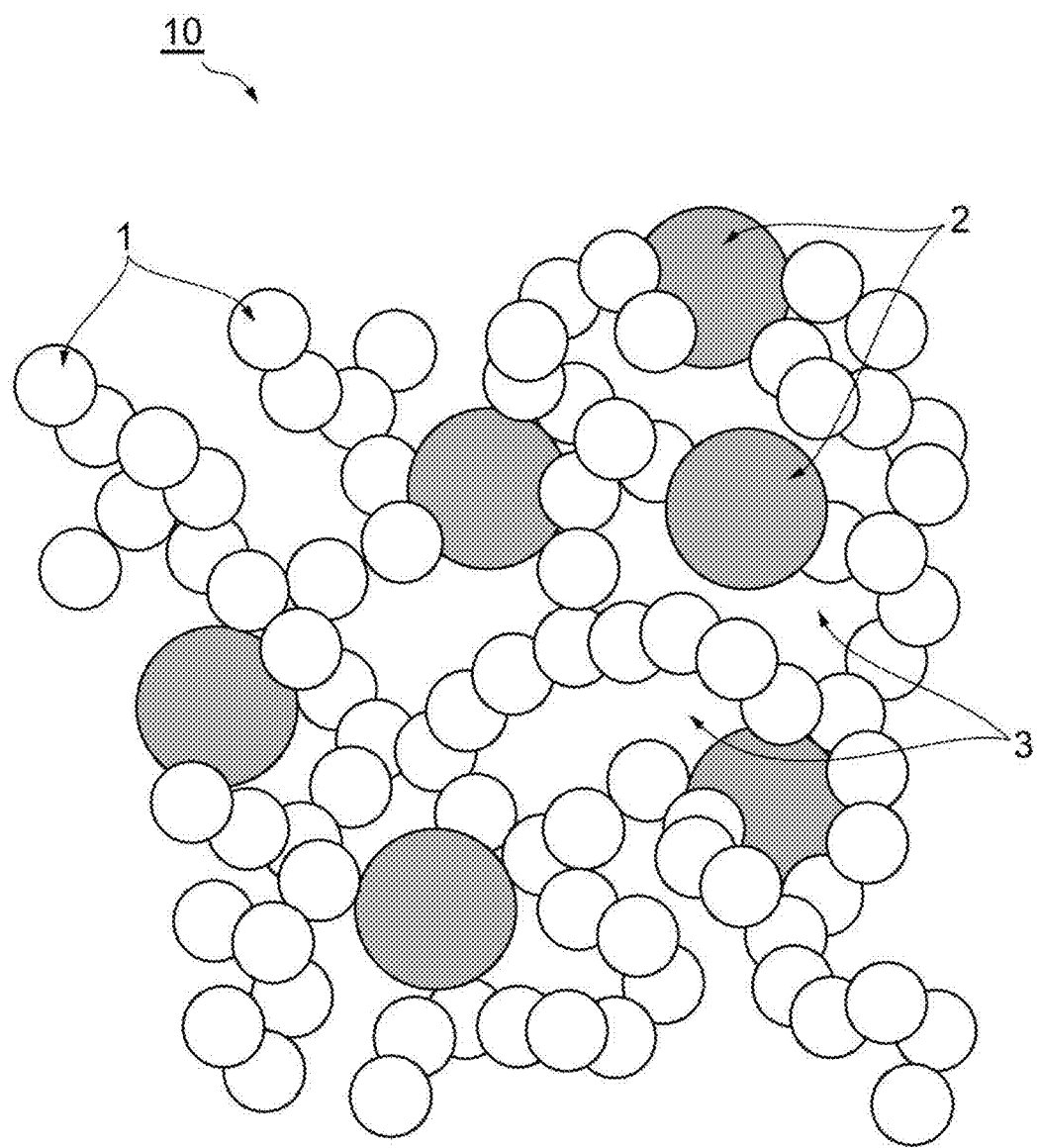
FIG. 1 shows a diagram schematically illustrating the microstructure of an aerogel composite according to an embodiment of the present disclosure.

Hereinafter, preferred embodiments of the present disclosure will be described in detail occasionally with reference to the drawings. However, the present disclosure is not limited to the embodiments below. In the present specification, a numerical range expressed with "to" represents a range including the numerical values set forth before and after "to" as the minimum value and the maximum value, respectively. When the phrase "A or B" is used, it is only required to include one of A and B, and both of A and B may be included. With respect to materials exemplified in the present embodiments, one material may be used singly, or two or more materials may be used in combination, unless otherwise stated.

<Aerogel Composite>

In a narrow sense, dry gel obtained by using supercritical drying for wet gel is referred to as aerogel, dry gel obtained by drying under the atmospheric pressure is referred to as xerogel, and dry gel obtained by using freeze drying is referred to as cryogel; however, a dry gel with low density obtained by using any of these techniques for drying wet gel is referred to as "aerogel" in the present embodiments. That is, the term "aerogel" in the present embodiments means aerogel in a broad sense, namely, "Gel comprised of a microporous solid in which the dispersed phase is a gas". In general, the inside of aerogel is formed of a fine network structure, and has a cluster structure in which aerogel particles (particles constituting the aerogel) with a size of around 2 to 20 nm are bonded together. Among skeletons formed in the cluster, pores with a size smaller than 100 nm are present. For this reason, aerogel has a three-dimensional fine porous structure. Aerogel in the present embodiments is, for example, silica aerogel, which comprises silica as a primary component. Examples of the silica aerogel include silica aerogel with an organic group (e.g., a methyl group) or an organic chain introduced therein, what is called organic-inorganic-hybridized silica aerogel. The aerogel composite in the present embodiments includes a composite of a silica particle in the aerogel, and at the same time has a cluster structure, which is a feature of the aerogel, and has a three-dimensional fine porous structure.

The aerogel composite in the present embodiments comprises an aerogel component and a silica particle. In another possible expression, although the expression does not necessarily have the same meaning as the previously-mentioned concept, the aerogel composite in the present embodiments comprises a silica particle as a component constituting a three-dimensional network skeleton. The aerogel composite in the present embodiments is superior in thermal insulation and flexibility as described later. In particular, the superior flexibility results in improvement of handleability as an aerogel composite, which allows production of a larger aerogel composite and hence improvement of the productivity. Such an aerogel composite is obtained by allowing a silica particle to be present in the environment of aerogel production. The advantage by allowing a silica particle to be present is not only that the thermal insulation, flexibility, and so on of the composite itself can be improved, but also that reduction of time for a step of forming wet gel, which is described later, and simplification of steps from a step of washing and solvent displacement to a step of drying can be achieved. It should be noted that the reduction of time for the step and the simplification of the steps are not necessarily required in production of an aerogel composite superior in flexibility.

In the present embodiments, various modes for the composite of the aerogel component and the silica particle are contemplated. For example, the aerogel component may be in an irregular shape such as a film, or be particulate (aerogel particle). In any mode, the aerogel component in various forms is present in between the silica particles, which is inferred to impart flexibility to the skeleton of the composite.

Examples of modes for the composite of the aerogel component and the silica particle include a mode in which the aerogel component in an irregular shape exists between the silica particles. Specific examples of such a mode include various modes including: a mode in which the silica particle is covered by a film of the aerogel component (silicone component) (a mode in which the aerogel component includes the silica particle therein); a mode in which the silica particles are bonded with each other via the aerogel component as a binder; a mode in which the aerogel component fills a plurality of voids of the silica particle; and a mode of combination of these modes (e.g., a mode in which a cluster array of the silica particle is covered by the aerogel component). As just described, the three-dimensional network skeleton of the aerogel composite in the present embodiments can be constituted with the silica particle and the aerogel component (silicone component), and the specific mode (embodiment) thereof is not limited in any way.

On the other hand, the aerogel component in the present embodiments may form a definite particulate composite, not in an irregular shape, with the silica particle as illustrated in FIG. 1 as described later.

Although the mechanism of formation of such various modes in the aerogel composite in the present embodiments is not necessarily clear, the present inventors suspect the formation rate of the aerogel component in a step of gelling to be involved therein. For example, the formation rate of the aerogel component tends to vary as the number of silanol groups of the silica particle varies. In addition, the formation rate of the aerogel component tends to vary as the pH of the system varies.

These suggest that the mode of the aerogel composite (e.g., the size and the shape of the three-dimensional network skeleton) can be controlled through adjustment of the size, shape, and number of silanol groups of the silica particle, and the pH and so on of the system. Accordingly, the density, porosity, and so on of the aerogel composite can be controlled, and hence the thermal insulation and flexibility of the aerogel composite can be controlled. The three-dimensional network skeleton of the aerogel composite may be constituted with only one of the above-described various modes, or with two or more of the modes.

Now, the aerogel composite in the present embodiments will be described with reference to FIG. 1 as an example, though the present disclosure is not limited to the mode in FIG. 1 as described above. However, the following description can be appropriately referred to with regard to matters common among the above modes (e.g., the type, size, content of the silica particle).

FIG. 1 shows a diagram schematically illustrating the microstructure of an aerogel composite according to an embodiment of the present disclosure. As illustrated in FIG. 1, an aerogel composite has: a three-dimensional network skeleton formed of three-dimensional random linkage of an aerogel particle 1 constituting the aerogel component with a silica particle 2 partially intervening; and a pore 3 surrounded by the skeleton. In this case, the silica particles 2 are present in between the aerogel particles 1, and inferred to function as a skeleton support to support the three-dimensional network skeleton. Hence, this structure probably imparts moderate strength to aerogel while thermal insulation and flexibility as aerogel are maintained. It follows that the aerogel composite in the present embodiments may have a three-dimensional network skeleton formed of three-dimensional random linkage of a silica particle with an aerogel particle intervening. The silica particle may be covered by the aerogel particle. The aerogel particle (aerogel component) is constituted with a silicon compound, and hence inferred to have high affinity to the silica particle. Probably for this reason, the silica particle was successfully introduced into the three-dimensional network skeleton of aerogel in the present embodiments. In this regard, silanol groups of the silica particle probably contribute to the affinity between the aerogel particle and the silica particle.

The aerogel particle 1 is inferred to be in a mode of a secondary particle constituted with a plurality of primary particles, and generally spherical. The average particle diameter (i.e., secondary particle diameter) of the aerogel particle 1 can be 2 nm or larger, and may be 5 nm or larger or 10 nm or larger. The average particle diameter can be 50 µm or smaller, and may be 2 µm or smaller or 200 nm or smaller. In other words, the average particle diameter can be 2 nm to 50 µm, and may be 5 nm to 2 µm or 10 nm to 200 nm. It becomes easier to obtain an aerogel composite superior in flexibility by setting the average particle diameter of the aerogel particle 1 to 2 nm or larger, and, on the other hand, it becomes easier to obtain an aerogel composite superior in thermal insulation by setting the average particle diameter to 50 μm or smaller. The average particle diameter of the primary particle constituting the aerogel particle 1 can be 0.1 nm to 5 μm because of easiness in forming a secondary particle with a porous structure of low density, and may be 0.5 nm to 200 nm or 1 nm to 20 nm.

Any silica particle can be used for the silica particle 2 without any limitation, and examples thereof include an amorphous silica particle. Examples of the amorphous silica particle include at least one selected from the group consisting of a fused silica particle, a fumed silica particle, and a colloidal silica particle. Among them, the colloidal silica particle has high monodispersity and facilitates prevention of aggregation in a sol composition. The silica particle 2 may be a silica particle having a hollow structure, a porous structure, or the like.

The shape of the silica particle 2 is not limited in any way, and examples thereof include a sphere, a cocoon, and an association. Use of the spherical particle among them as the silica particle 2 facilitates prevention of aggregation in a sol composition. The average primary particle diameter of the silica particle 2 can be 5 nm or larger, and may be 7 nm or larger. The average primary particle diameter can be 300 nm or smaller, and may be 200 nm or smaller. In other words, the average primary particle diameter is 5 to 300 nm, and may be 7 to 200 nm. By setting the average primary particle diameter of the silica particle 2 to 5 nm or larger, it becomes easier to impart moderate strength to aerogel and obtain an aerogel composite superior in shrinkage resistance in drying. By setting the average primary particle diameter of the silica particle 2 to 300 nm or smaller, on the other hand, it becomes easier to suppress the solid thermal conduction of the silica particle and obtain an aerogel composite superior in thermal insulation. In a sol composition, which is described later, it becomes easier to reduce time required to obtain wet gel from a sol composition by setting the average primary particle diameter of the silica particle 2 to 5 nm or larger. By setting the average primary particle diameter of the silica particle 2 to 300 nm or smaller, on the other hand, a sufficient pot life for a sol composition can be sufficiently ensured.

The specific surface area of the silica particle 2 can be 10 m$^2$/g or larger, and may be 20 m$^2$/g or larger or 30 m$^2$/g or larger. The specific surface area can be 600 m$^2$/g or smaller, and may be 300 m$^2$/g or smaller or 250 m$^2$/g or smaller. In other words, the specific surface area can be 10 to 600 m$^2$/g, and may be 20 to 300 m$^2$/g or 30 to 250 m$^2$/g. By setting the specific surface area of the silica particle 2 to 10 m$^2$/g or larger, it becomes easier to suppress the solid thermal conduction of the silica particle and obtain an aerogel composite superior in thermal insulation. By setting the specific surface area of the silica particle 2 to 600 m$^2$/g or smaller, on the other hand, it becomes easier to impart moderate strength to aerogel and obtain an aerogel composite superior in shrinkage resistance in drying. In a sol composition, which is described later, a sufficient pot life for a sol composition can be sufficiently ensured by setting the specific surface area of the silica particle 2 to 10 m$^2$/g or larger. On the other hand, it becomes easier to reduce time required to obtain wet gel from a sol composition by setting the specific surface area of the silica particle 2 to 600 m$^2$/g or smaller. The specific surface area of the silica particle 2 can be measured, for example, by using a pore distribution analyzer.

The aerogel particle 1 (aerogel component) and the silica particle 2 are inferred to be bonding together in a mode of hydrogen bonding or chemical bonding. In this situation, the hydrogen bonding or chemical bonding is probably formed of a silanol group or reactive group of the aerogel particle 1 (aerogel component) and a silanol group of the silica particle 2. Therefore, it probably becomes easier to impart moderate strength to aerogel if the mode of bonding is chemical bonding. In view of this, the particle to form a composite with the aerogel component is not limited to the silica particle, and an inorganic particle or organic particle having a silanol group on the particle surface can be also used.

The number of silanol groups of the silica particle 2 per 1 g can be $10 \times 10^{18}$ to $1000 \times 10^{18}$ groups/g, and may be $50 \times 10^{18}$ to $800 \times 10^{18}$ groups/g or $100 \times 10^{18}$ to $700 \times 10^{18}$ groups/g. By setting the number of silanol groups of the silica particle 2 per 1 g to $10 \times 10^{18}$ groups/g or more, the silica particle 2 can have better reactivity with the aerogel particle 1 (aerogel component), and it becomes easier to obtain an aerogel composite superior in shrinkage resistance. By setting the number of silanol groups of the silica particle 2 per 1 g to $1000 \times 10^{18}$ groups/g or less, it becomes easier to prevent rapid gelling in production of a sol composition and obtain a homogeneous aerogel composite.

In the present embodiments, the average particle diameter of a particle (e.g., the average secondary particle diameter of the aerogel particle, the average primary particle diameter of the silica particle) can be determined through direct observation of a cross-section of the aerogel composite by using a scanning electron microscope (hereinafter, abbreviated as "SEM"). For example, individual particle diameters can be determined for the aerogel particle or the silica particle on the basis of the diameter of the cross-section of the three-dimensional network skeleton. The diameter here refers to a diameter when the cross-section of a skeleton forming the three-dimensional network skeleton is regarded as a circle. The diameter when the cross-section is regarded as a circle refers to a diameter of a circle with an area equal to that of the cross-section. In calculation of an average particle diameter, the diameter of a circle is determined for 100 particles, and the diameters are averaged.

Figure 2:
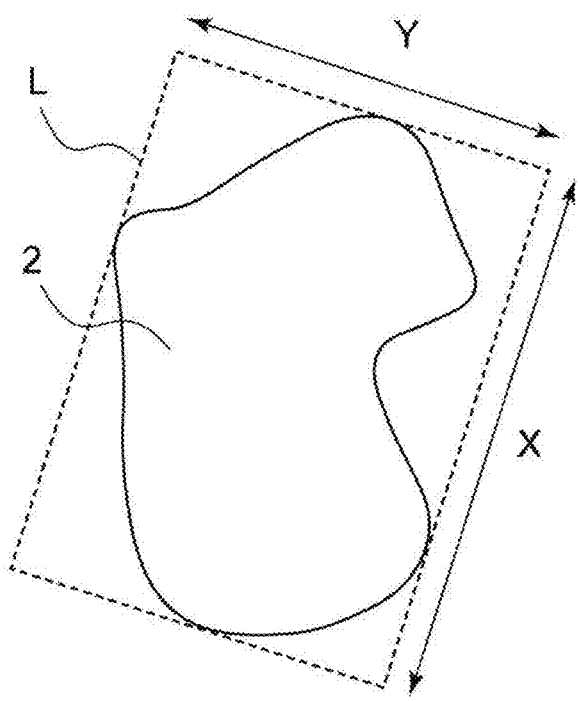
FIG. 2 shows a diagram for description of a method for calculating the biaxial average primary particle diameter of a particle.

The average particle diameter of the silica particle can be determined from measurement for the raw material. For example, the biaxial average primary particle diameter can be calculated from results of observation of arbitrarily selected 20 particles by using SEM as follows. Taking a colloidal silica particle with a solid concentration of 5 to 40% by mass, which is typically dispersed in water, as an example, a 2 cm×2 cm chip cut out of a wafer with a wiring pattern is soaked in a dispersion of the colloidal silica particle for approximately 30 seconds, and the chip is then rinsed with pure water for approximately 30 seconds and dried with nitrogen blowing. Thereafter, the chip is set on a sample stage for SEM observation, and an accelerating voltage of 10 kV is applied, and the silica particle is observed at a magnification of 100000× to take an image. From the image taken, 20 silica particles are arbitrarily selected, and the mean of the particle diameters of the particles is used as the average particle diameter. Here, when a silica particle selected has a shape illustrated in FIG. 2, a rectangle positioned in a manner such that the rectangle is circumscribed about the silica particle 2 and the long side is maximized (circumscribed rectangle L) is derived. The long side and short side of the circumscribed rectangle L are defined as X and Y, respectively, and the biaxial average primary particle diameter is calculated as (X+Y)/2, which is used as the particle diameter of the particle.

The size of the pore 3 in the aerogel composite will be described in the section [Density and porosity] described later.

The content of the aerogel component comprised in the aerogel composite can be 4 parts by mass or more, and may be 10 parts by mass or more, with respect to 100 parts by mass of the total amount of the aerogel composite. The content can be 25 parts by mass or less, and may be 20 parts by mass or less. In other words, the content can be 4 to 25 parts by mass, and may be 10 to 20 parts by mass. It becomes easier to impart moderate strength by setting the content to 4 parts by mass or more, and it becomes easier to obtain better thermal insulation by setting the content to 25 parts by mass or less.

The content of the silica particle comprised in the aerogel composite can be 1 part by mass or more, and may be 3 parts by mass or more, with respect to 100 parts by mass of the total amount of the aerogel composite. The content can be 25 parts by mass or less, and may be 15 parts by mass or less. In other words, the content can be 1 to 25 parts by mass, and may be 3 to 15 parts by mass. It becomes easier to impart moderate strength to the aerogel composite by setting the content to 1 part by mass or more, and it becomes easier to suppress the solid thermal conduction of the silica particle by setting the content to 25 parts by mass or less.

For the purpose of suppressing radiation of heat rays, the aerogel composite may further comprise an additional component such as carbon graphite, an aluminum compound, a magnesium compound, a silver compound, and a titanium compound, in addition to the aerogel component and the silica particle. The content of the additional component is not limited in any way, and can be 1 to 5 parts by mass with respect to 100 parts by mass of the total amount of the aerogel composite to sufficiently ensure desired effects of the aerogel composite.

[Thermal Conductivity]

The thermal conductivity of the aerogel composite in the present embodiments under the atmospheric pressure at 25° C. can be 0.03 W/m·K or lower, and may be 0.025 W/m·K or lower or 0.02 W/m·K or lower. Thermal insulation equal to or higher than that of polyurethane foam, a high-performance heat insulator, can be obtained by setting the thermal conductivity to 0.03 W/m·K or lower. The lower limit of the thermal conductivity is not limited in any way, and can be, for example, 0.01 W/m·K.

The thermal conductivity can be measured in accordance with a steady state method. Specifically, the thermal conductivity can be measured, for example, by using the thermal conductivity analyzer based on a steady state method "HFM 436 Lambda" (produced by NETZSCH, product name, HFM 436 Lambda is a registered trademark). Summary of a method for measuring the thermal conductivity by using the thermal conductivity analyzer based on a steady state method is as follows.

(Preparation of Measurement Sample)

The aerogel composite is processed into a piece in a size of 150×150×100 mm³ by using a blade with a blade angle of approximately 20 to 25 degrees, and the piece is used as a measurement sample. Here, the thermal conductivity measured with the sample size has been already confirmed to be almost the same as the thermal conductivity measured with the recommended sample size for the HFM 436 Lambda, 300×300×100 mm³. Subsequently, the measurement sample is shaped with a sand paper of #1500 or finer to thoroughly smooth the surface, as necessary. Before measurement of thermal conductivity, the measurement sample is dried by using the thermostatic dryer "DVS402" (produced by Yamato Scientific Co., Ltd., product name) under the atmospheric pressure at 100° C. for 30 minutes. The measurement sample is then transferred into a desiccator and cooled to 25° C. Thus, a measurement sample for measurement of the thermal conductivity is obtained.

(Measurement Method)

Measurement conditions are set such that measurement is performed under the atmospheric pressure at an average temperature of 25° C. The measurement sample obtained as described above is sandwiched between an upper heater and a lower heater with a load of 0.3 MPa, the temperature difference, $\Delta T$, is set to 20° C., and the upper surface temperature, lower surface temperature, and so on of the measurement sample are measured while the heat flow is adjusted to a one-dimensional heat flow by using a guard heater. The thermal resistance, $R_S$, of the measurement sample is determined by using the following equation:

$$R_S = N((T_U - T_L)/Q) - R_O$$

wherein $T_U$ denotes the upper surface temperature of the measurement sample; $T_L$ denotes the lower surface temperature of the measurement sample; $R_O$ denotes the contact thermal resistance of the upper/lower interface; and Q denotes output from a heat flux meter. N denotes a proportionality coefficient, and is determined in advance by using a calibration sample.

From the thermal resistance, $R_S$, obtained, the thermal conductivity, $\lambda$, of the measurement sample is determined by using the following equation:

$$\lambda = d/R_S$$

wherein d denotes the thickness of the measurement sample.

[Compression Modulus]

The compression modulus of the aerogel composite in the present embodiments at 25° C. can be 3 MPa or lower, and may be 2 MPa or lower or 1 MPa or lower or 0.5 MPa or lower. It becomes easier to obtain an aerogel composite superior in handleability by setting the compression modulus to 3 MPa or lower. The lower limit of the compression modulus is not limited in any way, and can be, for example, 0.05 MPa.

[Deformation Recovery Rate]

The deformation recovery rate of the aerogel composite in the present embodiments at 25° C. can be 90% or higher, and may be 94% or higher or 98% or higher. It becomes easier to obtain superior strength, superior flexibility against deformation, and the like by setting the deformation recovery rate to 90% or higher. The upper limit of the deformation recovery rate is not limited in any way, and can be, for example, 100% or 99%.

[Maximum Compression Deformation Rate]

The maximum compression deformation rate of the aerogel composite in the present embodiments at 25° C. can be 80% or higher, and may be 83% or higher or 86% or higher. It becomes easier to obtain superior strength, superior flexibility against deformation, and the like by setting the maximum compression deformation rate to 80% or higher. The upper limit of the maximum compression deformation rate is not limited in any way, and can be, for example, 90%.

The compression modulus, deformation recovery rate, and maximum compression deformation rate can be measured by using the compact table-top tester "EZ Test" (produced by Shimadzu Corporation, product name). Summary of a method for measuring compression modulus and so on by using the compact table-top tester is as follows.

(Preparation of Measurement Sample)

The aerogel composite is processed into a cube (dice) of 7.0×7.0×7.0 mm by using a blade with a blade angle of approximately 20 to 25 degrees, and the cube is used as a measurement sample. Subsequently, the measurement sample is shaped with a sand paper of #1500 or finer to thoroughly smooth the surface, as necessary. Before measurement, the measurement sample is dried by using the thermostatic dryer "DVS402" (produced by Yamato Scientific Co., Ltd., product name) under the atmospheric pressure at 100° C. for 30 minutes. The measurement sample is then transferred into a desiccator and cooled to 25° C. Thus, a measurement sample for measurement of the compression modulus, deformation recovery rate, and maximum compression deformation rate is obtained.

(Measurement Method)

A load cell of 500 N is used. An upper platen (φ20 mm) and lower platen (φ118 mm) each made of stainless steel are used as jigs for compression measurement. The measurement sample is set between the jigs, and compressed at a speed of 1 mm/min, and, for example, the change in size of the measurement sample at 25° C. is measured. The measurement is terminated at a point of time when a load of higher than 500 N is applied or when the measurement sample is broken. Here, the compressive strain, ε, can be determined by using the following equation:

$$\varepsilon = \Delta d/d1$$

wherein Δd denotes the change in thickness (mm) of the measurement sample caused by a load; and d1 denotes the thickness (mm) of the measurement sample before application of a load.

The compressive stress (MPa), σ, can be determined by using the following equation:

$$\sigma = F/A$$

wherein F denotes compressive force (N); and A denotes the cross-sectional area (mm$^2$) of the measurement sample before application of a load.

The compression modulus (MPa), E, can be determined, for example, in a range of compressive force from 0.1 to 0.2 N by using the following equation:

$$E = (\sigma_2 - \sigma_1)/(\varepsilon_2 - \varepsilon_1)$$

wherein $\sigma_1$ denotes compressive stress (MPa) measured at a compressive force of 0.1 N; $\sigma_2$ denotes compressive stress (MPa) measured at a compressive force of 0.2 N; $\varepsilon_1$ denotes compressive strain measured at a compressive stress of $\sigma_1$; and $\varepsilon_2$ denotes compressive strain measured at a compressive stress of $\sigma_2$.

The deformation recovery rate and maximum compression deformation rate can be determined in accordance with the following equations:

$$\text{Deformation recovery rate} = (d3-d2)/(d1-d2) \times 100$$

$$\text{Maximum compression deformation rate} = (d1-d2)/d1 \times 100$$

wherein d1 denotes the thickness of the measurement sample before application of a load; d2 denotes the thickness of the measurement sample at a point of time when a load of higher than 500 N is applied or when the measurement sample is broken; and d3 denotes the thickness of the measurement sample after removal of a load.

The thermal conductivity, compression modulus, deformation recovery rate, and maximum compression deformation rate can be appropriately adjusted, by changing conditions for production or raw materials or the like of the aerogel composite, which are described later.

[Density and Porosity]

The size of the pore 3, namely, the average pore diameter, in the aerogel composite in the present embodiments can be 5 to 1000 nm, and may be 25 to 500 nm. It becomes easier to obtain an aerogel composite superior in flexibility by setting the average pore diameter to 5 nm or larger, and it becomes easier to obtain an aerogel composite superior in thermal insulation by setting the average pore diameter to 1000 nm or smaller.

The density of the aerogel composite in the present embodiments at 25° C. can be 0.05 to 0.25 g/cm$^3$, and may be 0.1 to 0.2 g/cm$^3$. More superior strength and flexibility can be obtained by setting the density to 0.05 g/cm$^3$ or higher, and more superior thermal insulation can be obtained by setting the density to 0.25 g/cm$^3$ or lower.

The porosity of the aerogel composite in the present embodiments at 25° C. can be 85 to 95%, and may be 87 to 93%. More superior thermal insulation can be obtained by setting the porosity to 85% or higher, and more superior strength and flexibility can be obtained by setting the porosity to 95% or lower.

The average pore diameter, density, and porosity of the aerogel composite, with regard to the pore (through-hole) connected as a three-dimensional network, can be measured by using mercury porosimetry in accordance with DIN 66133. As the measurement apparatus, for example, an AutoPore IV9520 (produced by Shimadzu Corporation, product name) can be used.

<Specific Modes of Aerogel Component>

The aerogel composite in the present embodiments can comprise polysiloxane having a main chain including siloxane bonds (Si—O—Si). The aerogel composite can include, as a structural unit, the following unit M, unit D, unit T, or unit Q.

[Chemical Formula 4]

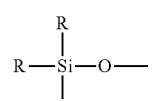

(M)

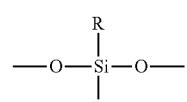

(D)

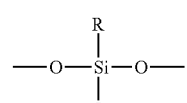

(T)

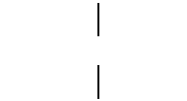

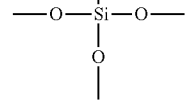

(Q)

In the formulas, R represents an atom (e.g., hydrogen atom) or atom group (e.g., alkyl group) bonding to a silicon atom. The unit M is a unit consisting of a monovalent group in which a silicon atom is bonding to one oxygen atom. The unit D is a unit consisting of a divalent group in which a silicon atom is bonding to two oxygen atoms. The unit T is a unit consisting of a trivalent group in which a silicon atom is bonding to three oxygen atoms. The unit Q is a unit consisting of a tetravalent group in which a silicon atom is bonding to four oxygen atoms. Information on the contents of these units can be acquired through Si-NMR.

Examples of the aerogel component of the aerogel composite in the present embodiments include modes described below. Use of any of these modes facilitates control of the thermal insulation and flexibility of the aerogel composite to desired levels. However, use of any of these modes is not necessarily intended to obtain the aerogel composite specified in the present embodiments. By using any of these modes, an aerogel composite having thermal conductivity and compression modulus corresponding to the mode can be obtained. Accordingly, an aerogel composite having thermal insulation and flexibility suitable for an intended application can be provided.

(First Mode)

The aerogel composite in the present embodiments can have a structure represented by the following formula (1). The aerogel composite powder in the present embodiments can have a structure represented by the following formula (1a), as the structure including a structure represented by the formula (1).

[Chemical Formula 5]

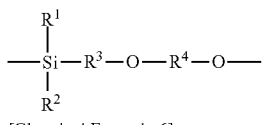

(1)

[Chemical Formula 6]

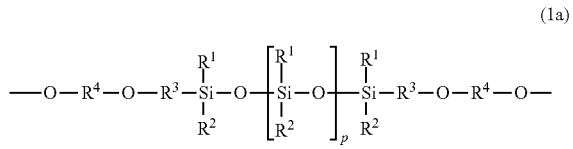

(1a)

In the formulas (1) and (1a), $R^1$ and $R^2$ each independently represent an alkyl group or an aryl group, and $R^3$ and $R^4$ each independently represent an alkylene group. Here, examples of the aryl group include a phenyl group and a substituted phenyl group. Examples of the substituent of the substituted phenyl group include an alkyl group, a vinyl group, a mercapto group, an amino group, a nitro group, and a cyano group. p represents an integer of 1 to 50. In the formula (1a), two or more groups as $R^1$ may be identical or different, and, similarly, two or more groups as $R^2$ may be identical or different. In the formula (1a), two or more groups as $R^3$ may be identical or different, and, similarly, two or more groups as $R^4$ may be identical or different.

Through introduction of the structure represented by the formula (1) or (1a), as the aerogel component, into the skeleton of the aerogel composite, the aerogel composite is provided with low thermal conductivity and becomes flexible. From such a viewpoint, $R^1$ and $R^2$ in the formulas (1) and (1a) are, in one example, each independently an alkyl group having one to six carbon atoms, a phenyl group, or another group, and examples of this alkyl group include a methyl group. $R^3$ and $R^4$ in the formulas (1) and (1a) are, in one example, each independently an alkylene group having one to six carbon atoms or another group, and examples of this alkylene group include an ethylene group and a propylene group. In the formula (1a), p can be 2 to 30, and may be 5 to 20.

(Second Mode)

The aerogel composite in the present embodiments has a ladder-type structure including struts and a bridge, wherein the bridge can have a structure represented by the following formula (2). Through introduction of such a ladder-type structure, as the aerogel component, into the skeleton of the aerogel composite, the heat resistance and mechanical strength can be improved. In the present embodiments, "ladder-type structure" is a structure including two struts and bridges each connecting the struts (a structure having the form of what is called "ladder"). In the present mode, the skeleton of the aerogel composite may consist of the ladder-type structure, and the aerogel composite may partially have the ladder-type structure.

[Chemical Formula 7]

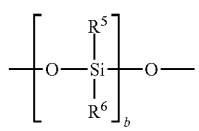

(2)

In the formula (2), $R^5$ and $R^6$ each independently represent an alkyl group or an aryl group, and b represents an integer of 1 to 50. Here, examples of the aryl group include a phenyl group and a substituted phenyl group. Examples of the substituent of the substituted phenyl group include an alkyl group, a vinyl group, a mercapto group, an amino group, a nitro group, and a cyano group. When b is an integer of 2 or more in the formula (2), two or more groups as $R^5$ may be identical or different, and, similarly, two or more groups as $R^6$ may be identical or different.

Through introduction of the above structure, as the aerogel component, into the skeleton of the aerogel composite, for example, the aerogel composite is provided with flexibility superior to that of aerogel having a structure derived from conventional ladder-type silsesquioxane (i.e., having a structure represented by the following formula (X)). Silsesquioxane is a polysiloxane having the composition formula $(RSiO_{1.5})_n$, and can have various skeleton structures such as those of cage-type, ladder-type, and random-type. While the structure of a bridge in aerogel having a structure derived from conventional ladder-type silsesquioxane is —O— (the aerogel includes the above unit T as a structural unit), as represented by the following formula (X), the structure of a bridge in the aerogel composite in the present mode is the structure represented by the above formula (2) (polysiloxane structure). However, the aerogel composite in the present mode may have a structure derived from silsesquioxane in addition to the structure represented by the formula (2).

[Chemical Formula 8]

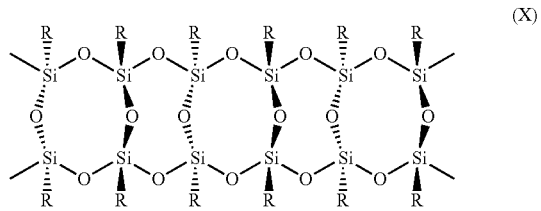

(X)

In the formula (X), R represents a hydroxy group, an alkyl group, or an aryl group.

The structure forming each strut and the chain length thereof, and the interval in the structure forming bridges are not limited in any way, and the ladder-type structure may be a ladder-type structure represented by the following formula (3) to further improve heat resistance and mechanical strength.

[Chemical Formula 9]

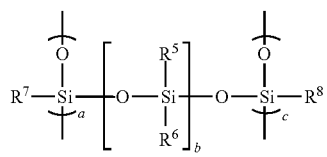

(3)

In the formula (3), $R^5$, $R^6$, $R^7$ and $R^8$ each independently represent an alkyl group or an aryl group; a and c each independently represent an integer of 1 to 3000; and b represents an integer of 1 to 50. Here, examples of the aryl group include a phenyl group and a substituted phenyl group. Examples of the substituent of the substituted phenyl group include an alkyl group, a vinyl group, a mercapto group, an amino group, a nitro group, and a cyano group. When b is an integer of 2 or more in the formula (3), two or more groups as $R^5$ may be identical or different, and, similarly, two or more groups as $R^6$ may be identical or different. When a is an integer of 2 or more in the formula (3), two or more groups as $R^7$ may be identical or different, and, similarly, when c is an integer of 2 or more, two or more groups as $R^8$ may be identical or different.

To obtain more superior flexibility, $R^5$, $R^6$, $R^7$ and $R^8$ in the formulas (2) and (3) ($R^7$ and $R^8$ are only in the formula (3)) are, in one example, each independently an alkyl group having one to six carbon atoms, a phenyl group, or another group, and examples of this alkyl group include a methyl group. In the formula (3), a and c can be each independently 6 to 2000, and may be each independently 10 to 1000. In the formulas (2) and (3), b can be 2 to 30, and may be 5 to 20.

(Other Modes)

The aerogel composite in the present embodiments can have a structure represented by the following formula (4). The aerogel composite in the present embodiments can comprise the silica particle and simultaneously have a structure represented by the following formula (4).

[Chemical Formula 10]

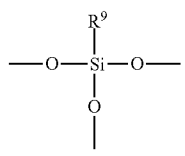

(4)

In the formula (4), $R^9$ represents an alkyl group. Examples of the alkyl group include an alkyl group having one to six carbon atoms, and examples of this alkyl group include a methyl group.

The aerogel composite in the present embodiments can have a structure represented by the following formula (5). The aerogel composite in the present embodiments can comprise the silica particle and simultaneously have a structure represented by the following formula (5).

[Chemical Formula 11]

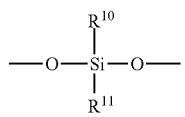

(5)

In the formula (5), $R^{10}$ and $R^{11}$ each independently represent an alkyl group. Here, examples of the alkyl group include an alkyl group having one to six carbon atoms, and examples of this alkyl group include a methyl group.

The aerogel composite in the present embodiments can have a structure represented by the following formula (6). The aerogel composite in the present embodiments can comprise the silica particle and simultaneously have a structure represented by the following formula (6).

[Chemical Formula 12]

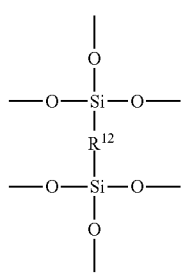

(6)

In the formula (6), $R^{12}$ represents an alkylene group. Here, examples of the alkylene group include an alkylene group having 1 to 10 carbon atoms, and examples of this alkylene group include an ethylene group and a hexylene group.

<Sol Composition for Forming Aerogel Composite>

The sol composition for forming an aerogel composite according to the present invention comprises: at least one selected from the group consisting of a silicon compound having a hydrolyzable functional group or a condensable functional group (in the molecule) and a hydrolysis product of the silicon compound having a hydrolyzable functional group; and a silica particle having an average primary particle diameter of 5 to 300 nm or a specific surface area of 10 to 600 $m^2/g$. Also the aerogel composite described hereinbefore may be a dried product of a wet gel as a condensate of the sol composition (a product derived by drying a wet gel formed from the sol: a dried product of a wet gel derived from the sol composition).

A silicon compound other than polysiloxane compounds, which are described later, can be used as the silicon compound having a hydrolyzable functional group or a condensable functional group. In other words, the sol composition can comprise at least one compound selected from the group consisting of a silicon compound having a hydrolyzable functional group or a condensable functional group (except polysiloxane compounds) and a hydrolysis product of the silicon compound having a hydrolyzable functional group (hereinafter, occasionally referred to as "group of silicon compounds"). The number of silicon atoms in the molecule of the silicon compound can be 1 or 2.

The silicon compound having a hydrolyzable functional group is not limited in any way, and examples thereof include alkylsilicon alkoxide. The number of hydrolyzable functional groups of the alkylsilicon alkoxide can be three or less to improve the water resistance. Examples of such alkylsilicon alkoxide include monoalkyltrialkoxysilane, monoalkyldialkoxysilane, dialkyldialkoxysilane, monoalkylmonoalkoxysilane, and dialkylmonoalkoxysilane, trialkylmonoalkoxysilane, specifically methyltrimethoxysilane, methyldimethoxysilane, dimethyldimethoxysilane, and ethyltrimethoxysilane. Examples of the hydrolyzable functional group include an alkoxy group such as a methoxy group and an ethoxy group.

The silicon compound having a condensable functional group is not limited in any way, and examples thereof include silanetetraol, methylsilanetriol, dimethylsilanediol, phenylsilanetriol, phenylmethylsilanediol, diphenylsilanediol, n-propylsilanetriol, hexylsilanetriol, octylsilanetriol, decylsilanetriol, and trifluoropropylsilanetriol.

The silicon compound having a hydrolyzable functional group or a condensable functional group may further have a reactive group different from a hydrolyzable functional group and a condensable functional group (a functional group corresponding to none of hydrolyzable functional groups and condensable functional groups). Examples of the reactive group include an epoxy group, a mercapto group, a glycidoxy group, a vinyl group, an acryloyl group, a methacryloyl group, and an amino group. The epoxy group may be included in an epoxy group-containing group such as a glycidoxy group.

Also applicable as a silicon compound having a reactive group in which the number of hydrolyzable functional groups is three or less are, for example, vinyltrimethoxysilane, 3-glycidoxypropyltrimethoxysilane, 3-glycidoxypropylmethyldimethoxysilane, 3-methacryloxypropyltrimethoxysilane, 3-methacryloxypropylmethyldimethoxysilane, 3-acryloxypropyltrimethoxysilane, 3-mercaptopropyltrimethoxysilane, 3-mercaptopropylmethyldimethoxysilane, N-phenyl-3-aminopropyltrimethoxysilane, and N-2-(aminoethyl)-3-aminopropylmethyldimethoxysilane.

Also applicable as a silicon compound having a condensable functional group and a reactive functional group are, for example, vinyl silanetriol, 3-glycidoxypropylsilanetriol, 3-glycidoxypropylmethylsilanediol, 3-methacryloxypropylsilanetriol, 3-methacryloxypropylmethylsilanediol, 3-acryloxypropylsilanetriol, 3-mercaptopropylsilanetriol, 3-mercaptopropylmethylsilanediol, N-phenyl-3-aminopropylsilanetriol, and N-2-(aminoethyl)-3-aminopropylmethylsilanediol.

In addition, bis(trimethoxysilyl)methane, bis(trimethoxysilyl)ethane, bis(trimethoxysilyl)hexane, ethyltrimethoxysilane, vinyltrimethoxysilane, etc., each as a silicon compound in which the number of hydrolyzable functional groups at molecular ends is three or less are also applicable.

The silicon compound having a hydrolyzable functional group or a condensable functional group (except polysiloxane compounds) and hydrolysis product of the silicon compound having a hydrolyzable functional group may be used singly, or as a mixture of two or more.

In production of the aerogel composite in the present embodiments, the silicon compound can comprise a polysiloxane compound having a hydrolyzable functional group or a condensable functional group. In other words, the sol composition comprising the silicon compound can further comprise at least one selected from the group consisting of a polysiloxane compound having a hydrolyzable functional group or a condensable functional group (in the molecule) and a hydrolysis product of the polysiloxane compound having a hydrolyzable functional group (hereinafter, occasionally referred to as "group of polysiloxane compounds").

The functional group of the polysiloxane compound or the like is not limited in any way, and can be a group reactive with the same functional group or reactive with another functional group. Examples of the hydrolyzable functional group include an alkoxy group. Examples of the condensable functional group include a hydroxy group, a silanol group, a carboxy group, and a phenolic hydroxy group. The hydroxy group may be included in a hydroxy group-containing group such as a hydroxyalkyl group. The polysiloxane compound having a hydrolyzable functional group or a condensable functional group may further have the above-described reactive group different from a hydrolyzable functional group and a condensable functional group (a functional group corresponding to none of hydrolyzable functional groups and condensable functional groups). The polysiloxane compound having the functional group and reactive group may be used singly, or as a mixture of two or more. Examples of the functional group and reactive group as a group to improve the flexibility of the aerogel composite include an alkoxy group, a silanol group, and hydroxyalkyl group, and the alkoxy group and hydroxyalkyl group among them can further improve the compatibility of the sol composition. For improvement of the reactivity of the polysiloxane compound and reduction of the thermal conductivity of the aerogel composite, the number of carbon atoms of the alkoxy group or hydroxyalkyl group can be 1 to 6, and may be 2 to 4 for further improvement of the flexibility of the aerogel composite.

Examples of the polysiloxane compound having a hydroxyalkyl group include those having a structure represented by the following formula (A). By using the polysiloxane compound having a structure represented by the following formula (A), the structures represented by the above formulas (1) and (1a) can be introduced into the skeleton of the aerogel composite.

[Chemical Formula 13]

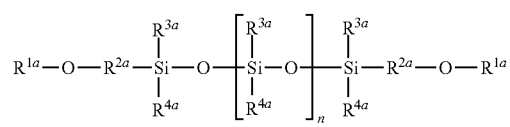

(A)

In the formula (A), $R^{1a}$ represents a hydroxyalkyl group; $R^{2a}$ represents an alkylene group; $R^{3a}$ and $R^{4a}$ each independently represent an alkyl group or an aryl group; and n represents an integer of 1 to 50. Here, examples of the aryl group include a phenyl group and a substituted phenyl group. Examples of the substituent of the substituted phenyl group include an alkyl group, a vinyl group, a mercapto group, an amino group, a nitro group, and a cyano group. In the formula (A), two groups as $R^{1a}$ may be identical or different, and, similarly, two groups as $R^{2a}$ may be identical or different. In the formula (A), two or more groups as $R^{3a}$ may be identical or different, and, similarly, two or more groups as $R^{4a}$ may be identical or different.

It becomes much easier to obtain an aerogel composite having low thermal conductivity and being flexible by using a wet gel as a condensate of the sol composition (or formed from the sol composition) comprising the polysiloxane compound having the above structure. From such a viewpoint, $R^{1a}$ in the formula (A) is, in one example, a hydroxyalkyl group having one to six carbon atoms, and examples of this hydroxyalkyl group include a hydroxyethyl group and a hydroxypropyl group. $R^{1a}$ in the formula (A) is, in one example, an alkylene group having one to six carbon atoms, and examples of this alkylene group include an ethylene group and a propylene group. $R^{3a}$ and $R^{4a}$ in the formula (A) are, in one example, each independently an alkyl group having one to six carbon atoms, a phenyl group, or another group, and examples of this alkyl group include a methyl group. In the formula (A), n can be 2 to 30, and may be 5 to 20.

A commercially available product can be used as the polysiloxane compound having the structure represented by the above formula (A), and examples thereof include compounds including X-22-160AS, KF-6001, KF-6002, and KF-6003 (all produced by Shin-Etsu Chemical Co., Ltd.) and compounds including XF42-B0970 and Fluid OFOH 702-4% (all produced by Momentive Performance Materials Inc.).

Examples of the polysiloxane compound having an alkoxy group include those having a structure represented by the following formula (B). By using the polysiloxane compound having a structure represented by the following formula (B), the ladder-type structure with bridges represented by the above formula (2) can be introduced into the skeleton of the aerogel composite.

[Chemical Formula 14]

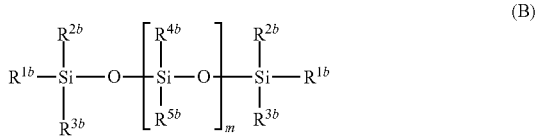

(B)

In the formula (B), $R^{1b}$ represents an alkyl group, an alkoxy group, or an aryl group; $R^{2b}$ and $R^{3b}$ each independently represent an alkoxy group; $R^{4b}$ and $R^{5b}$ each independently represent an alkyl group or an aryl group; and m represents an integer of 1 to 50. Here, examples of the aryl group include a phenyl group and a substituted phenyl group. Examples of the substituent of the substituted phenyl group include an alkyl group, a vinyl group, a mercapto group, an amino group, a nitro group, and a cyano group. In the formula (B), two groups as $R^{1b}$ may be identical or different, two groups as $R^{2b}$ may be identical or different, and, similarly, two groups as $R^{3b}$ may be identical or different. When m is an integer of 2 or more in the formula (B), two or more groups as $R^{4b}$ may be identical or different, and, similarly, two or more groups as $R^{5b}$ may be identical or different.

It becomes much easier to obtain an aerogel composite having low thermal conductivity and being flexible by using a wet gel as a condensate of the sol composition (or formed from the sol composition) comprising the polysiloxane compound having the above structure or a hydrolysis product thereof. From such a viewpoint, $R^{1b}$ in the formula (B) is, in one example, an alkyl group having one to six carbon atoms or an alkoxy group having one to six carbon atoms, and examples of this alkyl group or alkoxy group include a methyl group, a methoxy group, and an ethoxy group. $R^{2b}$ and $R^{3b}$ in the formula (B) are, in one example, each independently an alkoxy group having one to six carbon atoms, and examples of this alkoxy group include a methoxy group and an ethoxy group. $R^{4b}$ and $R^{5b}$ in the formula (B) are, in one example, each independently an alkyl group having one to six carbon atoms, a phenyl group, or another group, and examples of this alkyl group include a methyl group. In the formula (B), m can be 2 to 30, and may be 5 to 20.

The polysiloxane compound having the structure represented by the above formula (B) can be obtained appropriately with reference, for example, to any of production methods reported in Japanese Unexamined Patent Publication No. 2000-26609 and Japanese Unexamined Patent Publication No. 2012-233110.

Since an alkoxy group is hydrolyzable, the polysiloxane compound having an alkoxy group is possibly present as a hydrolysis product in the sol composition, and the polysiloxane compound having an alkoxy group and a hydrolysis product thereof may coexist. In the polysiloxane compound having an alkoxy group, alkoxy groups in the molecule may be totally hydrolyzed or partially hydrolyzed.

The polysiloxane compound having a hydrolyzable functional group or a condensable functional group and hydrolysis product of the polysiloxane compound having a hydrolyzable functional group may be used singly, or as a mixture of two or more.

The content of the group of silicon compounds (the sum total of the content of the silicon compound having a hydrolyzable functional group or a condensable functional group and the content of the hydrolysis product of the silicon compound having a hydrolyzable functional group) comprised in the sol composition can be 5 parts by mass or more, and may be 10 parts by mass or more, with respect to 100 parts by mass of the total amount of the sol composition. The content can be 50 parts by mass or less, and may be 30 parts by mass or less, with respect to 100 parts by mass of the total amount of the sol composition. In other words, the content of the group of silicon compounds can be 5 to 50 parts by mass, and may be 10 to 30 parts by mass, with respect to 100 parts by mass of the total amount of the sol composition. It becomes easier to obtain better reactivity by setting the content to 5 parts by mass or more, and it becomes easier to obtain better compatibility by setting the content to 50 parts by mass or less.

When the sol composition further comprises the polysiloxane compound, the sum total of the content of the group of silicon compounds and the content of the group of polysiloxane compounds (the sum total of the content of the polysiloxane compound having a hydrolyzable functional group or a condensable functional group and the content of the hydrolysis product of the polysiloxane compound having a hydrolyzable functional group) can be 5 parts by mass or more, and may be 10 parts by mass or more, with respect to 100 parts by mass of the total amount of the sol composition. The sum total of the contents can be 50 parts by mass or less, and may be 30 parts by mass or less, with respect to 100 parts by mass of the total amount of the sol composition. In other words, the sum total of the contents can be 5 to 50 parts by mass, and may be 10 to 30 parts by mass, with respect to 100 parts by mass of the total amount of the sol composition. It becomes much easier to obtain better reactivity by setting the sum total of the contents to 5 parts by mass or more, and it becomes much easier to obtain better compatibility by setting the sum total of the contents to 50 parts by mass or less. In this case, the ratio of the content of the group of silicon compounds to the content of the group of polysiloxane compounds can be 0.5:1 to 4:1, and may be 1:1 to 2:1. It becomes much easier to obtain better compatibility by setting the ratio of the contents of these compounds to 0.5:1 or higher, and it becomes much easier to prevent the gel from shrinking by setting the ratio of the contents of these compounds to 4:1 or lower.

The content of the silica particle comprised in the sol composition can be 1 part by mass or more, and may be 4 parts by mass or more, with respect to 100 parts by mass of the total amount of the sol composition. The content can be 20 parts by mass or less, and may be 15 parts by mass or less, with respect to 100 parts by mass of the total amount of the sol composition. In other words, the content of the silica particle can be 1 to 20 parts by mass, and may be 4 to 15 parts by mass, with respect to 100 parts by mass of the total amount of the sol composition. It becomes easier to impart moderate strength to aerogel and obtain an aerogel composite superior in shrinkage resistance in drying by setting the content to 1 part by mass or more. It becomes easier to suppress the solid thermal conduction of the silica particle and obtain an aerogel composite superior in thermal insulation by setting the content to 20 parts by mass or less.

<Method for Producing Aerogel Composite>

Next, the method for producing an aerogel composite will be described. The method for producing an aerogel composite is not limited in any way, and an aerogel composite can be produced, for example, by using the following method.

Specifically, the aerogel composite in the present embodiments can be produced by using a production method primarily including: a step of forming a sol (sol composition); a step of forming a wet gel, where the sol composition obtained in the step of forming a sol is gelled and then aged to obtain a wet gel; a step of washing and solvent displacement, where the wet gel obtained in the step of forming a wet gel is washed and subjected to solvent displacement (as necessary); and a step of drying, where the wet gel washed and subjected to solvent displacement is dried. "Sol" refers to a state before the occurrence of gelling reaction, and, in the present embodiments, a state in which the group of silicon compounds, optionally with the group of polysiloxane compounds, and the silica particle are dissolved or dispersed in a solvent. Wet gel refers to a gel solid in a wet state which contains a liquid medium but does not have fluidity.

Now, each step of the method for producing the aerogel composite in the present embodiments will be described.

(Step of Forming Sol)

The step of forming a sol is a step in which the above-described silicon compound, optionally with the polysiloxane compound, and the silica particle or a solvent containing the silica particle are mixed together for hydrolysis to form the sol composition. In this step, an acid catalyst may be further added into the solvent to accelerate hydrolysis reaction. As shown in Japanese Patent No. 5250900, a surfactant, a thermally-hydrolyzable compound, etc., can be added into the solvent. Moreover, a component such as carbon graphite, an aluminum compound, a magnesium compound, a silver compound, and a titanium compound may be added into the solvent, for example, for the purpose of suppressing radiation of heat rays.

For example, water or a mixed solution of water and an alcohol can be used as the solvent. Examples of the alcohol include methanol, ethanol, n-propanol, 2-propanol, n-butanol, 2-butanol, and t-butanol. Among them, alcohols with a low surface tension and low boiling point for reduction of the interfacial tension on a gel wall are, for example, methanol, ethanol, and 2-propanol. These may be used singly, or as a mixture of two or more thereof.

If an alcohol is used as the solvent, for example, the amount of the alcohol can be 4 to 8 mol, and may be 4 to 6.5 mol or 4.5 to 6 mol, with respect to 1 mol of the total amount of the group of silicon compounds and the group of polysiloxane compounds. It becomes much easier to obtain better compatibility by setting the amount of the alcohol to 4 mol or more, and it becomes much easier to prevent the gel from shrinking by setting the amount of the alcohol to 8 mol or less.

Examples of the acid catalyst include inorganic acids such as hydrofluoric acid, hydrochloric acid, nitric acid, sulfuric acid, sulfurous acid, phosphoric acid, phosphorous acid, hypophosphorous acid, bromic acid, chloric acid, chlorous acid, and hypochlorous acid; acidic phosphates such as acidic aluminum phosphate, acidic magnesium phosphate, and acidic zinc phosphate; and organic carboxylic acids such as acetic acid, formic acid, propionic acid, oxalic acid, malonic acid, succinic acid, citric acid, malic acid, adipic acid, and azelaic acid. Among them, acid catalysts to further improve the water resistance of an aerogel composite to be obtained are, for example, organic carboxylic acids. Examples of such organic carboxylic acids include acetic acid; however, formic acid, propionic acid, oxalic acid, malonic acid, and so on are also acceptable. These may be used singly, or as a mixture of two or more thereof.

By using the acid catalyst, hydrolysis reaction of the silicon compound and the polysiloxane compound can be accelerated and the sol composition can be obtained in a shorter period of time.

The amount of the acid catalyst to be added can be 0.001 to 0.1 parts by mass with respect to 100 parts by mass of the total amount of the group of silicon compounds and the group of polysiloxane compounds.

For the surfactant, nonionic surfactant, ionic surfactant, or the like can be used. These may be used singly, or as a mixture of two or more thereof.

For the nonionic surfactant, for example, a compound including a hydrophilic moiety such as polyoxyethylene and a hydrophobic moiety primarily consisting of an alkyl group or a compound including a hydrophilic moiety such as polyoxypropylene can be used. Examples of the compound including a hydrophilic moiety such as polyoxyethylene and a hydrophobic moiety primarily consisting of an alkyl group include polyoxyethylene nonyl phenyl ether, polyoxyethylene octyl phenyl ether, and polyoxyethylene alkyl ether. Examples of the compound including a hydrophilic moiety such as polyoxypropylene include polyoxypropylene alkyl ether and a block copolymer of polyoxyethylene and polyoxypropylene.

Examples of the ionic surfactant include cationic surfactant, anionic surfactant, and amphoteric surfactant. Examples of the cationic surfactant include cetyltrimethylammonium bromide and cetyltrimethylammonium chloride, and examples of the anionic surfactant include sodium dodecylsulfonate. Examples of the amphoteric surfactant include amino acid-based surfactant, betaine-based surfactant, and amine oxide-based surfactant. Examples of the amino acid-based surfactant include acylglutamic acid. Examples of the betaine-based surfactant include betaine lauryldimethylaminoacetate and betaine stearyldimethylaminoacetate. Examples of the amine oxide-based surfactant include lauryldimethylamine oxide.

In the step of forming a wet gel, which is described later, these surfactants are inferred to act to reduce the difference in chemical affinity between a solvent and a growing siloxane polymer in the reaction system, and thereby prevent phase separation.

The amount of the surfactant to be added can be, for example, 1 to 100 parts by mass with respect to 100 parts by mass of the total amount of the group of silicon compounds and the group of polysiloxane compounds, although it depends on the type of the surfactant and the types and amounts of the group of silicon compounds and the group of polysiloxane compounds. The amount to be added may be 5 to 60 parts by mass.

The thermally-hydrolyzable compound is inferred to generate a base catalyst through thermal hydrolysis to basify the reaction solution, and accelerate sol-gel reaction in the step of forming a wet gel, which is described later. Hence, the thermally-hydrolyzable compound is not limited in any way as long as it is a compound capable of basifying the reaction solution after hydrolysis, and examples thereof include urea; acid amide such as formamide, N-methylformamide, N,N-dimethylformamide, acetamide, N-methylacetamide, and N,N-dimethylacetamide; and cyclic nitrogen compounds such as hexamethylenetetramine Among them, urea particularly satisfactorily provides the above accelerating effect.

The amount of the thermally-hydrolyzable compound to be added is not limited in any way as long as it is an amount such that sol-gel reaction can be sufficiently accelerated in the step of forming a wet gel, which is described later. When urea is used as the thermally-hydrolyzable compound, for example, the amount of urea to be added can be 1 to 200 parts by mass with respect to 100 parts by mass of the total amount of the group of silicon compounds and the group of polysiloxane compounds. The amount to be added may be 2 to 150 parts by mass. It becomes much easier to obtain good reactivity by setting the amount to be added to 1 part by mass or more, and it becomes much easier to prevent precipitation of crystals and lowering of gel density by setting the amount to be added to 200 parts by mass or less.

Hydrolysis in the step of forming a sol may be performed, for example, in a temperature environment of 20 to 60° C. for 10 minutes to 24 hours, and may be performed in a temperature environment of 50 to 60° C. for 5 minutes to 8 hours, although the conditions depend on the types and amounts of the silicon compound, polysiloxane compound, silica particle, acid catalyst, surfactant, etc., in the mixed solution. Thereby, the hydrolyzable functional groups in the silicon compound and polysiloxane compound are sufficiently hydrolyzed, and hence a hydrolysis product of the silicon compound and a hydrolysis product of the polysiloxane compound can be obtained more reliably.

When the thermally-hydrolyzable compound is added into the solvent, however, the temperature environment in the step of forming a sol may be controlled to a temperature such that the hydrolysis of the thermally-hydrolyzable compound is inhibited to prevent the sol composition from gelling. The temperature in this case may be any temperature such that the hydrolysis of the thermally-hydrolyzable compound can be inhibited. When urea is used as the thermally-hydrolyzable compound, for example, the temperature environment in the step of forming a sol can be 0 to 40° C., and may be 10 to 30° C.

(Step of Forming Wet Gel)

The step of forming a wet gel is a step in which the sol composition obtained in the step of forming a sol is gelled and then aged to obtain a wet gel. In this step, a base catalyst can be used to accelerate gelling.

Examples of the base catalyst include alkali metal hydroxides such as lithium hydroxide, sodium hydroxide, potassium hydroxide, and cesium hydroxide; ammonium compounds such as ammonium hydroxide, ammonium fluoride, ammonium chloride, and ammonium bromide; basic sodium phosphate such as sodium metaphosphate, sodium pyrophosphate, and sodium polyphosphate; aliphatic amines such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propyl amine, 3-methoxyamine, dimethylethanolamine, methyldiethanolamine, diethanolamine, and triethanolamine; nitrogen-containing heterocyclic compounds such as morpholine, N-methylmorpholine, 2-methylmorpholine, piperazine and derivatives thereof, piperidine and derivatives thereof, and imidazole and derivatives thereof. Among them, ammonium hydroxide (aqueous ammonia) is superior in that, as well as superiority in economic efficiency, it has high volatility and is less likely to remain in the aerogel composite after drying, and hence hardly deteriorates the water resistance. These base catalysts may be used singly, or as a mixture of two or more thereof.

By using the base catalyst, dehydration condensation reaction or dealcoholization condensation reaction of the silicon compound, polysiloxane compound, and silica particle can be accelerated to complete the gelling of the sol composition in a shorter period of time. Thereby, a wet gel with higher strength (rigidity) can be obtained. In particular, ammonia has high volatility and is less likely to remain in the aerogel composite, and hence an aerogel composite more superior in water resistance can be obtained by using ammonia as the base catalyst.

The amount of the base catalyst to be added can be 0.5 to 5 parts by mass, and may be 1 to 4 parts by mass, with respect to 100 parts by mass of the total amount of the group of silicon compounds and the group of polysiloxane compounds. Gelling can be completed in a shorter period of time by setting the amount of the base catalyst to be added to 0.5 parts by mass or more, and lowering of the water resistance can be more reduced by setting the amount to 5 parts by mass or less.

Gelling of the sol composition in the step of forming a wet gel may be performed in an airtight container so as not to allow the solvent and base catalyst to volatile. The gelling temperature can be 30 to 90° C., and may be 40 to 80° C. Gelling can be completed in a shorter period of time and a wet gel with higher strength (rigidity) can be obtained by setting the gelling temperature to 30° C. or higher. It becomes easier to suppress the volatilization of the solvent (in particular, an alcohol) by setting the gelling temperature to 90° C. or lower, and hence gelling can be completed while volume shrinkage is prevented.

Aging in the step of forming a wet gel may be performed in an airtight container so as not to allow the solvent and base catalyst to volatize. Aging strengthens the bonding of the components constituting a wet gel, and as a result a wet gel with sufficiently high strength (rigidity) for preventing shrinkage in drying can be obtained. The aging temperature can be 30 to 90° C., and may be 40 to 80° C. A wet gel with higher strength (rigidity) can be obtained by setting the aging temperature to 30° C. or higher, and it becomes easier to suppress the volatilization of the solvent (in particular, an alcohol) by setting the aging temperature to 90° C. or lower, and hence gelling can be completed while volume shrinkage is prevented.

It is often difficult to determine when the gelling of the sol composition is completed, and hence gelling and subsequent aging of the sol composition may be sequentially performed in a series of operations.

The gelling time and aging time depend on the gelling temperature and aging temperature; however, the silica particle is comprised in the sol composition in the present embodiments, and as a result, in particular, the gelling time can be reduced as compared with conventional methods for producing aerogel. The reason is presumably that silanol groups or reactive groups possessed by the silicon compound, polysiloxane compound, etc., in the sol composition form hydrogen bonding or chemical bonding with silanol groups of the silica particle. The gelling time can be 10 to 120 minutes, and may be 20 to 90 minutes. It becomes easier to obtain a more homogeneous wet gel by setting the gelling time to 10 minutes or longer, and the steps from the step of washing and solvent displacement to the step of drying, which are described later, can be simplified by setting the gelling time to 120 minutes or shorter. The total time of the gelling time and aging time, as a total of the step of gelling and aging, can be 4 to 480 hours, and may be 6 to 120 hours. A wet gel with higher strength (rigidity) can be obtained by setting the total of the gelling time and aging time to 4 hours or longer, and it becomes easier to maintain the effect of aging by setting the total of the gelling time and aging time to 480 hours or shorter.

To impart a lower density or a larger average pore diameter to an aerogel composite to be obtained, the gelling temperature and aging temperature may be raised within the above range or the total time of the gelling time and aging time may be prolonged within the above range. Alternatively, to impart a higher density or a smaller average pore diameter to an aerogel composite to be obtained, the gelling temperature and aging temperature may be lowered within the above range or the total time of the gelling time and aging time may be shortened within the above range.

(Step of Washing and Solvent Displacement)

The step of washing and solvent displacement is a step including a substep of washing the wet gel obtained in the step of forming a wet gel (a substep of washing) and a substep of displacing the washing solution in the wet gel with a solvent suitable for conditions for drying (in the step of drying described later) (a substep of solvent displacement). Although the step of washing and solvent displacement can be performed in a manner such that the substep of washing the wet gel is not performed and only the substep of solvent displacement is performed, the wet gel may be washed to reduce impurities including unreacted matters and byproducts in the wet gel and enable production of an aerogel composite having higher purity. In the present embodiments, the substep of solvent displacement after the substep of washing is not necessarily essential, as described later, because the silica particle is comprised in the gel.

In the substep of washing, the wet gel obtained in the step of forming a wet gel is washed. This washing can be performed repeatedly, for example, by using water or an organic solvent. In washing, the washing efficiency can be improved by heating.

For the organic solvent, various organic solvents can be used, such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylene chloride, N,N-dimethylformamide, dimethylsulfoxide, acetic acid, and formic acid. These organic solvents may be used singly, or as a mixture of two or more thereof.

In the substep of solvent displacement, which is described later, a solvent with low surface tension can be used to prevent the gel from shrinking due to drying. However, solvents with low surface tension generally have extremely low mutual solubility with water. For this reason, the organic solvent used for the substep of washing when a solvent with low surface tension is used in the substep of solvent displacement is, for example, a hydrophilic organic solvent having high mutual solubility with both water and the solvent with low surface tension. The hydrophilic organic solvent used in the substep of washing can serve for pre-displacement for the substep of solvent displacement. Examples of the hydrophilic organic solvent include, among the above organic solvents, methanol, ethanol, 2-propanol, acetone, and methyl ethyl ketone. Methanol, ethanol, methyl ethyl ketone, etc., are superior in economic efficiency.

The amount of water or the organic solvent used in the substep of washing can be an amount such that the solvent in the wet gel can be sufficiently displaced and washed out. The amount can be 3 to 10 times the volume of the wet gel. Washing can be repeated until the moisture content of the wet gel after washing reaches 10% by mass or less to the mass of silica.

The temperature environment in the substep of washing can be a temperature equal to or lower than the boiling point of the solvent used for washing, and, when methanol is used, for example, heating can be performed at a temperature of around 30 to 60° C.

In the substep of solvent displacement, the solvent of the wet gel washed is displaced with a specific solvent for displacement to prevent shrinkage in the step of drying, which is described later. Then, the efficiency of displacement can be improved by heating. Specifically, when drying is performed under the atmospheric pressure at a temperature lower than the critical point of the solvent used in drying in the step of drying, the solvent for displacement is, for example, a solvent with low surface tension, which is described later. When supercritical drying is performed, on the other hand, the solvent for displacement is, for example, ethanol, methanol, 2-propanol, dichlorodifluoromethane, carbon dioxide, or a mixed solvent of two or more of them.

Examples of the solvent with low surface tension include solvents with a surface tension of 30 mN/m or lower at 20° C. The surface tension may be 25 mN/m or lower or 20 mN/m or lower. Examples of the solvent with low surface tension include aliphatic hydrocarbons such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2), and 1-pentene (16.0); aromatic hydrocarbons such as benzene (28.9), toluene (28.5), m-xylene (28.7), and p-xylene (28.3); halogenated hydrocarbons such as dichloromethane (27.9), chloroform (27.2), carbon tetrachloride (26.9), 1-chloropropane (21.8), and 2-chloropropane (18.1); ethers such as ethyl ether (17.1), propyl ether (20.5), isopropyl ether (17.7), butyl ethyl ether (20.8), and 1,2-dimethoxyethane (24.6); ketones such as acetone (23.3), methyl ethyl ketone (24.6), methyl propyl ketone (25.1), and diethyl ketone (25.3); and esters such as methyl acetate (24.8), ethyl acetate (23.8), propyl acetate (24.3), isopropyl acetate (21.2), isobutyl acetate (23.7), and ethyl butyrate (24.6), where a numerical value in each parenthesis indicates surface tension at 20° C., and the unit is [mN/m]. Among them, aliphatic hydrocarbons (e.g., hexane, heptane) have low surface tension, and are superior in terms of the working environment. In addition, hydrophilic organic solvents among the above solvents, such as acetone, methyl ethyl ketone, and 1,2-dimethoxyethane, can simultaneously serve as the organic solvent for the substep of washing, if used. A solvent with a boiling point of 100° C. or lower at ambient pressure among the above solvents may be used because of easiness in drying in the step of drying, which is described later. The above solvents may be used singly, or as a mixture of two or more thereof.

The amount of the solvent to be used in the substep of solvent displacement can be an amount such that the solvent in the wet gel after washing can be sufficiently displaced. The amount can be 3 to 10 times the volume of the wet gel.

The temperature environment in the substep of solvent displacement can be a temperature equal to or lower than the boiling point of the solvent used for displacement, and, when heptane is used, for example, heating can be performed at a temperature of around 30 to 60° C.

In the present embodiments, the substep of solvent displacement is not necessarily essential, as described above, because the silica particle is comprised in the gel. The mechanism is inferred as follows: while the solvent of the wet gel is, in conventional methods, displaced with a specific solvent for displacement (a solvent with low surface tension) to prevent shrinkage in the step of drying, the silica particle functions as a support for the three-dimensional network skeleton and the skeleton is supported in the present embodiments, and the shrinkage of the gel in the step of drying is prevented; therefore, the gel can be subjected directly to the step of drying without displacement of the solvent used in washing. As described above, the steps from the step of washing and solvent displacement to the step of drying can be simplified in the present embodiments. However, the present embodiments never exclude implementation of the substep of solvent displacement.

(Step of Drying)

In the step of drying, the wet gel washed and (as necessary) subjected to solvent displacement as described above is dried. Thereby, an aerogel composite is eventually obtained. That is, an aerogel derived by drying the wet gel formed from the above sol can be obtained.

The technique for drying is not limited in any way, and known ambient pressure drying, supercritical drying, or freeze drying can be used. Among them, ambient pressure drying or supercritical drying can be used for easiness in production of an aerogel composite having low density. To enable production at low cost, ambient pressure drying can be used. In the present embodiments, ambient pressure refers to 0.1 MPa (atmospheric pressure).

The aerogel composite in the present embodiments can be obtained by drying the wet gel washed and (as necessary) subjected to solvent displacement under the atmospheric pressure at a temperature lower than the critical point of the solvent used in drying. The drying temperature, which depends on the type of the solvent used for displacement (the solvent used in washing, for the case without solvent displacement), can be 20 to 150° C. in consideration that drying at high temperature particularly increases the evaporation rate of the solvent and in some cases generates a large crack in the gel. The drying temperature may be 60 to 120° C. The drying time depends on the volume of the wet gel and the drying temperature, and can be 4 to 120 hours. In the present embodiments, acceleration of drying by applying a pressure lower than the critical point in a manner such that the productivity is not lowered is also encompassed in the concept of ambient pressure drying.

Alternatively, the aerogel composite in the present embodiments can be obtained by applying supercritical drying to the wet gel washed and (as necessary) subjected to solvent displacement. Supercritical drying can be performed by using a known technique. Examples of the method for supercritical drying include a method of removing the solvent contained in the wet gel at a temperature and pressure equal to or higher than the critical point of the solvent. Another example of the method for supercritical drying is a method in which the wet gel is soaked in liquified carbon dioxide, for example, under conditions of around 20 to 25° C. and 5 to 20 MPa to totally or partially displace the solvent contained in the wet gel with carbon dioxide, which has a critical point lower than the solvent, and single carbon dioxide or a mixture of carbon dioxide and the solvent is then removed.

The aerogel composite obtained through ambient drying or supercritical drying as describe above may be further subjected to additional drying under ambient pressure at 105 to 200° C. for about 0.5 to 2 hours. Thereby, it becomes much easier to obtain an aerogel composite having low density and small pores. The additional drying may be performed under ambient pressure at 150 to 200° C.

<Support Member Provided with Aerogel Composite>

The support member provided with an aerogel composite in the present embodiments includes the aerogel composite described hereinbefore, and a support member supporting the aerogel composite. This support member provided with an aerogel composite can exhibit high thermal insulation and superior bending properties.

Examples of the support member include a film support member, a sheet support member, a foil support member, and a porous support member.

The film support member is a shaped product of a polymer material as a thin film, and examples thereof include organic films of PET or polyimide, and glass films (including metal-deposited films).

The sheet support member is a shaped product of a fibrous raw material of organic substance, inorganic substance, or metal, and examples thereof include paper sheets, nonwoven fabrics (including glass mats), organic fiber clothes, and glass clothes.

The foil support member is a shaped product of a metal raw material as a thin film, and examples thereof include aluminum foils and copper foils.

The porous support member is a product formed of a raw material of organic substance, inorganic substance, or metal and having a porous structure, and examples thereof include porous organic materials (e.g., polyurethane foams), porous inorganic materials (e.g., zeolite sheets), and porous metal materials (e.g., porous metal sheets, porous aluminum sheets).

The support member provided with an aerogel composite can be produced, for example, as follows. First, a sol composition is prepared in accordance with the above-described step of forming a sol. The sol composition is applied onto a support member by using a film applicator or the like, or a support member is impregnated with the sol composition, and thereafter a film support member provided with a wet gel is obtained in accordance with the above-described step of forming a wet gel. Subsequently, the resulting film support member provided with a wet gel is washed and (as necessary) subjected to solvent displacement in accordance with the above-described step of washing and solvent displacement, and further dried in accordance with the above-described step of drying to afford a support member provided with an aerogel composite.

The thickness of the aerogel composite formed on the film support member or foil support member can be 1 to 200 μm, and may be 10 to 100 μm or 30 to 80 μm. It becomes easier to obtain good thermal insulation by setting the thickness to 1 μm or larger, and it becomes easier to obtain flexibility by setting the thickness to 200 μm or smaller.

The thus-described aerogel composite in the present embodiments has superior thermal insulation and superior flexibility, which have been difficult to achieve for conventional aerogels, by virtue of the configuration such that the aerogel composite comprises the aerogel component and the silica particle. In particular, the superior flexibility enables formation of a layer of an aerogel composite on a film support member or foil support member, which has been difficult to achieve. Accordingly, the support member provided with an aerogel composite in the present embodiments has high thermal insulation and superior bending properties. Even in modes in which a sheet support member or porous support member are impregnated with the sol composition, the dust fall of the aerogel composite can be prevented in handling after drying.

For these advantages, the aerogel composite and support member with an aerogel composite in the present embodiments can be applied to, for example, application as a heat insulator in the field of construction, in the field of automobiles, for home appliances, in the field of semiconductor, or for industrial facilities. In addition to application as a heat insulator, the aerogel composite in the present embodiments can be used as an additive for coating materials, a cosmetic, an anti-blocking agent, a catalyst support, etc.

<Heat Insulator>

The heat insulator in the present embodiments includes the aerogel composite described hereinabove, and has high thermal insulation and superior bending properties. An aerogel composite obtained by using the above method for producing an aerogel composite can be used directly (or after being processed into an intended shape, as necessary) as a heat insulator. Similarly, the support member provided with an aerogel composite can be used as a heat insulator.

EXAMPLES

Now, the present disclosure will be described in more detail with reference to the following Examples; however, these Examples are not intended to limit the present disclosure.

Example 1

[Wet Gel, Aerogel Composite]

Mixed together were 200.0 parts by mass of PL-06L as a silica particle-containing raw material, 0.10 parts by mass of acetic acid as an acid catalyst, 20.0 parts by mass of cetyltrimethylammonium bromide (produced by Wako Pure Chemical Industries, Ltd.: hereinafter, abbreviated as "CTAB") as a cationic surfactant, and 120.0 parts by mass of urea as a thermally-hydrolyzable compound, and thereto 80.0 parts by mass of methyltrimethoxysilane, LS-530 (produced by Shin-Etsu Chemical Co., Ltd., product name: hereinafter, abbreviated as "MTMS"), as a silicon compound and 20.0 parts by mass of an alkoxy-modified polysiloxane compound with bifunctionality at each end and having the structure represented by the above formula (B) (hereinafter, referred to as "polysiloxane compound A") as a polysiloxane compound were added, and the resultant was reacted at 25° C. for 2 hours to afford a sol composition. The sol composition obtained was gelled at 60° C., and then aged at 80° C. for 24 hours to afford a wet gel.

Thereafter, the wet gel obtained was soaked in 2500.0 parts by mass of methanol, and washed at 60° C. over 12 hours. This washing operation was performed three times, where methanol was replaced with another one in each washing. Subsequently, the wet gel washed was soaked in 2500.0 parts by mass of heptane as a solvent with low surface tension, and subjected to solvent displacement at 60° C. over 12 hours. This solvent displacement operation was performed three times, where heptane was replaced with another one in each solvent displacement. The wet gel washed and subjected to solvent displacement was dried under ambient pressure at 40° C. for 96 hours, and thereafter further dried at 150° C. for 2 hours to afford an aerogel composite having the structures represented by the above formulas (3) and (4).

The above "polysiloxane compound A" had been synthesized as follows. First, 100.0 parts by mass of dimethylpolysiloxane with hydroxy ends "XC96-723" (produced by Momentive Performance Materials Inc., product name), 181.3 parts by mass of methyltrimethoxysilane, and 0.50 parts by mass of t-butylamine were mixed together in a 1 L three-necked flask equipped with a stirrer, a thermometer, and a Dimroth condenser, and reacted at 30° C. for 5 hours. Thereafter, the reaction solution was heated under a reduced pressure of 1.3 kPa at 140° C. for 2 hours for removal of volatile components to afford the alkoxy-modified polysiloxane compound with bifunctionality at each end (polysiloxane compound A).

[Support Member Provided with Aerogel Composite]

Film Support Member Provided with Aerogel Composite

The sol composition was applied onto a polyethylene terephthalate film with a size of 300 mm (length)×270 mm (width)×12 μm (thickness) by using a film applicator (produced by TESTER SANGYO CO., LTD., PI-1210) so that the thickness after gelling was 40 μm, and gelled at 60° C. for 3 hours, and then aged at 80° C. for 24 hours to afford a film support member provided with wet gel.

Thereafter, the film support member provided with wet gel obtained was soaked in 100 mL of methanol, and washed at 60° C. over 2 hours. Subsequently, the film support member provided with wet gel washed was soaked in 100 mL of methyl ethyl ketone, and subjected to solvent displacement at 60° C. over 2 hours. This solvent displacement operation was performed twice, where methyl ethyl ketone was replaced with another one in each solvent displacement. The film support member provided with wet gel washed and subjected to solvent displacement was dried under ambient pressure at 120° C. for 6 hours to afford a film support member provided with an aerogel composite.

Sheet Support Member Provided with Aerogel Composite

An E-glass cloth with a size of 300 mm (length)×270 mm (width)×100 μm (thickness) was impregnated with the sol composition so that the thickness of a sheet support member after gelling was 120 μm, and the sol composition was gelled at 60° C. for 3 hours, and then aged at 80° C. for 24 hours to afford a sheet support member provided with wet gel.

Thereafter, the sheet support member provided with wet gel obtained was soaked in 300 mL of methanol, and washed at 60° C. over 2 hours. Subsequently, the sheet support member provided with wet gel washed was soaked in 300 mL of methyl ethyl ketone, and subjected to solvent displacement at 60° C. over 2 hours. This solvent displacement operation was performed twice, where methyl ethyl ketone was replaced with another one in each solvent displacement. The sheet support member provided with wet gel washed and subjected to solvent displacement was dried under ambient pressure at 120° C. for 8 hours to afford a sheet support member provided with an aerogel composite.

Foil Support Member Provided with Aerogel Composite

The sol composition was applied onto an aluminum foil with a size of 300 mm (length)×270 mm (width)×12 μm (thickness) by using a film applicator so that the thickness after gelling was 40 μm, and gelled at 60° C. for 3 hours, and then aged at 80° C. for 24 hours to afford a foil support member provided with wet gel.

Thereafter, the foil support member provided with wet gel obtained was soaked in 100 mL of methanol, and washed at 60° C. over 2 hours. Subsequently, the foil support member provided with wet gel washed was soaked in 100 mL of methyl ethyl ketone, and subjected to solvent displacement at 60° C. over 2 hours. This solvent displacement operation was performed twice, where methyl ethyl ketone was replaced with another one in each solvent displacement. The foil support member provided with wet gel washed and subjected to solvent displacement was dried under ambient pressure at 120° C. for 6 hours to afford a foil support member provided with an aerogel composite.

Porous Support Member Provided with Aerogel Composite

A flexible urethane foam with a size of 300 mm (length)×270 mm (width)×10 mm (thickness) was impregnated with the sol composition so that the thickness of a porous support member after gelling was 10 mm, and the sol composition was gelled at 60° C. for 3 hours, and then aged at 80° C. for 24 hours to afford a porous support member provided with wet gel.

Thereafter, the porous support member provided with wet gel obtained was soaked in 300 mL of methanol, and washed at 60° C. over 2 hours. Subsequently, the porous support member provided with wet gel washed was soaked in 300 mL of methyl ethyl ketone, and subjected to solvent displacement at 60° C. over 2 hours. This solvent displacement operation was performed twice, where methyl ethyl ketone was replaced with another one in each solvent displacement. The porous support member provided with wet gel washed and subjected to solvent displacement was dried under ambient pressure at 120° C. for 10 hours to afford a porous support member provided with an aerogel composite.

Example 2

Mixed together were 167.0 parts by mass of PL-1 as a silica particle-containing raw material, 33.0 parts by mass of water, 0.10 parts by mass of acetic acid as an acid catalyst, 20.0 parts by mass of CTAB as a cationic surfactant, and 120.0 parts by mass of urea as a thermally-hydrolyzable compound, and thereto 60.0 parts by mass of MTMS and 40.0 parts by mass of dimethyldimethoxysilane, LS-520 (produced by Shin-Etsu Chemical Co., Ltd., product name: hereinafter, abbreviated as "DMDMS") as silicon compounds were added, and the resultant was reacted at 25° C. for 2 hours to afford a sol composition. The sol composition obtained was gelled at 60° C., and then aged at 80° C. for 24 hours to afford a wet gel. Thereafter, by using the wet gel obtained, an aerogel composite having the structures represented by the above formulas (4) and (5) was obtained in the same manner as in Example 1.

Further, support members provided with an aerogel composite were obtained by using the sol composition in the same manner as in Example 1.

Example 3

Mixed together were 60.0 parts by mass of MTMS and 40.0 parts by mass of DMDMS as silicon compounds, and 100.0 parts by mass of PL-2L as a silica particle-containing raw material, 40.0 parts by mass of water, and 80.0 parts by mass of methanol, and thereto 0.10 parts by mass of acetic acid as an acid catalyst was added, and the resultant was reacted at 25° C. for 2 hours to afford a sol composition. To the sol composition obtained, 40.0 parts by mass of aqueous ammonia with a concentration of 5% as a base catalyst was added, and the sol composition was gelled at 60° C., and then aged at 80° C. for 24 hours to afford a wet gel. Thereafter, by using the wet gel obtained, an aerogel composite having the structures represented by the above formulas (4) and (5) was obtained in the same manner as in Example 1.

Further, support members provided with an aerogel composite were obtained by using the sol composition in the same manner as in Example 1.

Example 4

Mixed together were 10.0 parts by mass of AEROSIL 90 as a silica particle-containing raw material, 190.0 parts by mass of water, 0.10 parts by mass of acetic acid as an acid catalyst, 20.0 parts by mass of CTAB as a cationic surfactant, and 120.0 parts by mass of urea as a thermally-hydrolyzable compound, and thereto 60.0 parts by mass of MTMS and 40.0 parts by mass of DMDMS as silicon compounds were added, and the resultant was reacted at 25° C. for 2 hours to afford a sol composition. The sol composition obtained was gelled at 60° C., and then aged at 80° C. for 24 hours to afford a wet gel. Thereafter, by using the wet gel obtained, an aerogel composite having the structures represented by the above formulas (4) and (5) was obtained in the same manner as in Example 1.

Further, support members provided with an aerogel composite were obtained by using the sol composition in the same manner as in Example 1.

Example 5

Mixed together were 87.0 parts by mass of PL-7 as a silica particle-containing raw material, 113.0 parts by mass of water, 0.10 parts by mass of acetic acid as an acid catalyst, 20.0 parts by mass of CTAB as a cationic surfactant, and 120.0 parts by mass of urea as a thermally-hydrolyzable compound, and thereto 60.0 parts by mass of MTMS and 40.0 parts by mass of DMDMS as silicon compounds were added, and the resultant was reacted at 25° C. for 2 hours to afford a sol composition. The sol composition obtained was gelled at 60° C., and then aged at 80° C. for 24 hours to afford a wet gel. Thereafter, by using the wet gel obtained, an aerogel composite having the structures represented by the above formulas (4) and (5) was obtained in the same manner as in Example 1.

Further, support members provided with an aerogel composite were obtained by using the sol composition in the same manner as in Example 1.

Example 6

Mixed together were 143.0 parts by mass of ST-OZL-35 as a silica particle-containing raw material, 57.0 parts by mass of water, 0.10 parts by mass of acetic acid as an acid catalyst, 20.0 parts by mass of CTAB as a cationic surfactant, and 120.0 parts by mass of urea as a thermally-hydrolyzable compound, and thereto 60.0 parts by mass of MTMS and 20.0 parts by mass of DMDMS as silicon compounds, and 20.0 parts by mass of an alkoxy-modified polysiloxane compound with trifunctionality at each end and having the structure represented by the above formula (B) (hereinafter, referred to as "polysiloxane compound B") as a polysiloxane compound were added, and the resultant was reacted at 25° C. for 2 hours to afford a sol composition. The sol composition obtained was gelled at 60° C., and then aged at 80° C. for 24 hours to afford a wet gel. Thereafter, by using the wet gel obtained, an aerogel composite having the structures represented by the above formulas (2), (4), and (5) was obtained in the same manner as in Example 1.

The above "polysiloxane compound B" had been synthesized as follows. First, 100.0 parts by mass of XC96-723, 202.6 parts by mass of tetramethoxysilane, and 0.50 parts by mass of t-butylamine were mixed together in a 1 L three-necked flask equipped with a stirrer, a thermometer, and a Dimroth condenser, and reacted at 30° C. for 5 hours. Thereafter, the reaction solution was heated under a reduced pressure of 1.3 kPa at 140° C. for 2 hours for removal of volatile components to afford the alkoxy-modified polysiloxane compound with trifunctionality at each end (polysiloxane compound B).

Further, support members provided with an aerogel composite were obtained by using the sol composition in the same manner as in Example 1.

Example 7

Mixed together were 100.0 parts by mass of PL-20 as a silica particle-containing raw material, 100.0 parts by mass of water, 0.10 parts by mass of acetic acid as an acid catalyst, 20.0 parts by mass of CTAB as a cationic surfactant, and 120.0 parts by mass of urea as a thermally-hydrolyzable compound, and thereto 60.0 parts by mass of MTMS as a silicon compound and 40.0 parts by mass of the polysiloxane compound B as a polysiloxane compound were added, and the resultant was reacted at 25° C. for 2 hours to afford a sol composition. The sol composition obtained was gelled at 60° C., and then aged at 80° C. for 24 hours to afford a wet gel. Thereafter, by using the wet gel obtained, an aerogel composite having the structures represented by the above formulas (2) and (4) was obtained in the same manner as in Example 1.

Further, support members provided with an aerogel composite were obtained by using the sol composition in the same manner as in Example 1.

Example 8

Mixed together were 200.0 parts by mass of ST-OXS as a silica particle-containing raw material, 0.10 parts by mass of acetic acid as an acid catalyst, 20.0 parts by mass of CTAB as a cationic surfactant, and 120.0 parts by mass of urea as a thermally-hydrolyzable compound, and thereto 60.0 parts by mass of MTMS and 40.0 parts by mass of DMDMS as silicon compounds were added, and the resultant was reacted at 25° C. for 2 hours to afford a sol composition. The sol composition obtained was gelled at 60° C., and then aged at 80° C. for 24 hours to afford a wet gel. Thereafter, by using the wet gel obtained, an aerogel composite having the structures represented by the above formulas (4) and (5) was obtained in the same manner as in Example 1.

Further, support members provided with an aerogel composite were obtained by using the sol composition in the same manner as in Example 1.

Comparative Example 1

Mixed together were 10.0 parts by mass of SO-C2 as a silica particle-containing raw material, 190.0 parts by mass of water, 0.10 parts by mass of acetic acid as an acid catalyst, 20.0 parts by mass of CTAB as a cationic surfactant, and 120.0 parts by mass of urea as a thermally-hydrolyzable compound, and thereto 60.0 parts by mass of MTMS and 40.0 parts by mass of bis(trimethoxysilyl)hexane as silicon compounds were added, and the resultant was reacted at 25° C. for 2 hours to afford a sol composition. As described later, phase separation was found for the sol composition in Comparative Example 1 in evaluation of the state of a sol composition after standing, and for this reason an aerogel composite and support members provided with an aerogel composite were not produced.

Comparative Example 2

Mixed together were 200.0 parts by mass of water, 0.10 parts by mass of acetic acid as an acid catalyst, 20.0 parts by mass of CTAB as a cationic surfactant, and 120.0 parts by mass of urea as a thermally-hydrolyzable compound, and thereto 100.0 parts by mass of MTMS as a silicon compound was added, and the resultant was reacted at 25° C. for 2 hours to afford a sol composition. The sol composition obtained was gelled at 60° C., and then aged at 80° C. for 24 hours to afford a wet gel. Thereafter, by using the wet gel obtained, an aerogel was obtained in the same manner as in Example 1.

Further, support members provided with aerogel were obtained by using the sol composition in the same manner as in Example 1.

Comparative Example 3

Mixed together were 200.0 parts by mass of water, 0.10 parts by mass of acetic acid as an acid catalyst, 20.0 parts by mass of CTAB as a cationic surfactant, and 120.0 parts by mass of urea as a thermally-hydrolyzable compound, and thereto 80.0 parts by mass of MTMS and 20.0 parts by mass of DMDMS as silicon compounds were added, and the resultant was reacted at 25° C. for 2 hours to afford a sol composition. The sol composition obtained was gelled at 60° C., and then aged at 80° C. for 24 hours to afford a wet gel. Thereafter, by using the wet gel obtained, an aerogel was obtained in the same manner as in Example 1.

Further, support members provided with aerogel were obtained by using the sol composition in the same manner as in Example 1.

Information on the silica particle-containing raw materials and Si raw materials used in Examples and Comparative Examples are summarized in Tables 1 and 2.

TABLE 1

| | Silica particle-containing raw material | | | | | | |
|---|---|---|---|---|---|---|---|
| | | | Silica particle | | | | |
| | Name | Supplier | Type | Shape | Average primary particle diameter (nm) | Specific surface area (m²/g) | Solid content (% by weight) |
| Example 1 | PL-06L | FUSO CHEMICAL CO., LTD. | colloidal silica | sphere | 7 | 452 | 6 |
| Example 2 | PL-1 | FUSO CHEMICAL CO., LTD. | colloidal silica | association | 15 | 200 | 12 |
| Example 3 | PL-2L | FUSO CHEMICAL CO., LTD. | colloidal silica | sphere | 20 | 162 | 20 |
| Example 4 | AEROSIL90 | NIPPON AEROSIL CO., LTD. | fumed silica | sphere | 20 | 93 | 100 |
| Example 5 | PL-7 | FUSO CHEMICAL CO., LTD. | colloidal silica | cocoon | 75 | 35 | 23 |
| Example 6 | ST-OZL-35 | Nissan Chemical Industries, Ltd. | colloidal silica | sphere | 100 | 32 | 35 |
| Example 7 | PL-20 | FUSO CHEMICAL CO., LTD. | colloidal silica | sphere | 200 | 12 | 20 |
| Example 8 | ST-OXS | Nissan Chemical Industries, Ltd. | colloidal silica | sphere | 5 | 518 | 10 |
| Comparative Example 1 | SO-C2 | Admatechs Company Limited | fused silica | sphere | 500 | 7 | 100 |
| Comparative Example 2 | — | — | — | — | — | — | — |
| Comparative Example 3 | — | — | — | — | — | — | — |

TABLE 2

| | Si raw material | | Silica particle-containing raw material |
|---|---|---|---|
| | Type | Amount added (part by weight) | Amount added (part by weight) |
| Example 1 | MTMS<br>polysiloxane compound A | 80.0<br>20.0 | 200 |
| Example 2 | MTMS<br>DMDMS | 60.0<br>40.0 | 167 |
| Example 3 | MTMS<br>DMDMS | 60.0<br>40.0 | 100 |
| Example 4 | MTMS<br>DMDMS | 60.0<br>40.0 | 10 |
| Example 5 | MTMS<br>DMDMS | 60.0<br>40.0 | 87 |
| Example 6 | MTMS<br>DMDMS<br>polysiloxane compound B | 60.0<br>20.0<br>20.0 | 143 |
| Example 7 | MTMS<br>polysiloxane compound B | 60.0<br>40.0 | 100 |
| Example 8 | MTMS<br>DMDMS | 60.0<br>40.0 | 200 |
| Comparative Example 1 | MTMS<br>bis-(trimethoxysilyl)-hexane | 60.0<br>40.0 | 10 |
| Comparative Example 2 | MTMS | 100.0 | — |
| Comparative Example 3 | MTMS<br>DMDMS | 80.0<br>20.0 | — |

[Evaluations]

Measurement or evaluation was conducted for the sol compositions, wet gels, aerogel composites, and support members provided with an aerogel composite obtained in Examples, and the sol compositions, wet gels, aerogels, and support members provided with aerogel obtained in Comparative Examples, under the following conditions. Evaluation results for the state of a sol composition after standing, state of an aerogel composite or aerogel in ambient pressure drying of methanol-displaced gel, and the thermal conductivity, compression modulus, density and porosity of an aerogel composite or aerogel are summarized in Table 3. Evaluation results of a 180° bending test for the support members provided with an aerogel composite and support members provided with aerogel are summarized in Table 4.

(1) Evaluation of State of Sol Composition after Standing

Into a 100 mL airtight PP container, 30 mL of the sol composition obtained in each of Examples and Comparative Examples was transferred and left to stand at room temperature for 6 hours, and thereafter the presence or absence of phase separation in the sol composition was visually observed for evaluation. For Comparative Example 1, for which phase separation was found in the sol composition, subsequent evaluations were not conducted.

(2) Measurement of Gelling Time

Into a 100 mL airtight PP container, 30 mL of the sol composition obtained in each of Examples and Comparative Examples was transferred, which was used as a measurement sample.

Subsequently, the measurement sample was placed in the thermostatic dryer "DVS402" (produced by Yamato Scientific Co., Ltd., product name) set at 60° C., and the time from the entrance to gelling was measured.

(3) State of Aerogel Composite or Aerogel in Ambient Pressure Drying of Methanol-Displaced Gel In 150.0 parts by mass of methanol, 30.0 parts by mass of the wet gel obtained in each of Examples and Comparative Examples was soaked, and washed at 60° C. over 12 hours. This washing operation was performed three times, where methanol was replaced with another one in each washing. Subsequently, the wet gel washed was processed into a piece in a size of 100×100×100 mm³ by using a blade with a blade angle of approximately 20 to 25 degrees, and the piece was used as a measurement sample before drying. By using the thermostat with a safety vent "SPH (H)-202" (produced by ESPEC CORP., product name), the measurement sample before drying obtained was dried at 60° C. for 2 hours and at 100° C. for 3 hours, and then further dried at 150° C. for 2 hours to afford a measurement sample after drying (the solvent evaporation rate and so on were not controlled in any way). Then, the volume shrinkage of the sample before and after drying, SV, was determined by using the following equation. A case that the volume shrinkage, SV, was 5% or lower was rated as "not shrunk", and a case that the volume shrinkage, SV, was 5% or higher was rated as "shrunk".

$$SV=(V_0-V_1)/V_0 \times 100$$

In the equation, $V_0$ denotes the volume of a sample before drying; and $V_1$ denotes the volume of the sample after drying.

(4) Measurement of Thermal Conductivity

An aerogel composite or aerogel was processed into a piece in a size of 150×150×100 mm³ by using a blade with a blade angle of approximately 20 to 25 degrees, and the piece was used as a measurement sample. Subsequently, the measurement sample was shaped with a sand paper of #1500 or finer to thoroughly smooth the surface, as necessary. Before measurement of thermal conductivity, the measurement sample obtained was dried by using the thermostatic dryer "DVS402" (produced by Yamato Scientific Co., Ltd., product name) under the atmospheric pressure at 100° C. for 30 minutes. The measurement sample was then transferred into a desiccator and cooled to 25° C. Thus, a measurement sample for measurement of the thermal conductivity was obtained.

Measurement of thermal conductivity was conducted by using the thermal conductivity analyzer based on a steady state method "HFM 436 Lambda" (produced by NETZSCH, product name). Measurement conditions were set such that measurement was performed under the atmospheric pressure at an average temperature of 25° C. The measurement sample obtained as described above was sandwiched between an upper heater and a lower heater with a load of 0.3 MPa, the temperature difference, ΔT, was set to 20° C., and the upper surface temperature, lower surface temperature, and so on of the measurement sample were measured while the heat flow was adjusted to a one-dimensional heat flow by using a guard heater. The thermal resistance, $R_S$, of the measurement sample was determined by using the following equation:

$$R_S = N((T_U-T_L)/Q) - R_O$$

wherein $T_U$ denotes the upper surface temperature of the measurement sample; $T_L$ denotes the lower surface temperature of the measurement sample; $R_O$ denotes the contact thermal resistance of the upper/lower interface; and Q denotes output from a heat flux meter. N denotes a proportionality coefficient, and had been determined in advance by using a calibration sample.

From the thermal resistance, $R_S$, obtained, the thermal conductivity, λ, of the measurement sample was determined by using the following equation:

$$\lambda = d/R_S$$

wherein d denotes the thickness of the measurement sample.

(5) Measurement of Compression Modulus

An aerogel composite or aerogel was processed into a cube (dice) of 7.0×7.0×7.0 mm by using a blade with a blade angle of approximately 20 to 25 degrees, and the cube was used as a measurement sample. Subsequently, the measurement sample was shaped with a sand paper of #1500 or finer to thoroughly smooth the surface, as necessary. Before measurement, the measurement sample obtained was dried by using the thermostatic dryer "DVS402" (produced by Yamato Scientific Co., Ltd., product name) under the atmospheric pressure at 100° C. for 30 minutes. The measurement sample was then transferred into a desiccator and cooled to 25° C. Thus, a measurement sample for measurement of the compression modulus was obtained.

For the measurement apparatus, the compact table-top tester "EZ Test" (produced by Shimadzu Corporation, product name) was used. A load cell of 500 N was used. An upper platen (φ20 mm) and lower platen (φ118 mm) each made of stainless steel were used as jigs for compression measurement. The measurement sample was set between the upper platen and lower platen positioned in parallel, and compressed at a speed of 1 mm/min. The measurement temperature was 25° C., and the measurement was terminated at a point of time when a load of higher than 500 N was applied or when the measurement sample was broken. Here, the strain, s, was determined by using the following equation:

$$\varepsilon = \Delta d/d1$$

wherein Δd denotes the change in thickness (mm) of the measurement sample caused by a load; and d1 denotes the thickness (mm) of the measurement sample before application of a load.

The compressive stress (MPa), σ, was determined by using the following equation:

$$\sigma = F/A$$

wherein F denotes compressive force (N); and A denotes the cross-sectional area (mm²) of the measurement sample before application of a load.

The compression modulus (MPa), E, was determined in a range of compressive force from 0.1 to 0.2 N by using the following equation:

$$E=(\sigma_2-\nu_1)/(\varepsilon_2-\varepsilon_1)$$

wherein $\sigma_1$ denotes compressive stress (MPa) measured at a compressive force of 0.1 N; $\sigma2$ denotes compressive stress (MPa) measured at a compressive force of 0.2 N; $\varepsilon_1$ denotes compressive strain measured at a compressive stress of $\sigma_1$; and ε2 denotes compressive strain measured at a compressive stress of $\sigma_2$.

(6) Measurement of Density and Porosity

The density and porosity of an aerogel composite or aerogel, with regard to the pore (through-hole) connected as a three-dimensional network, were measured by using mercury porosimetry in accordance with DIN 66133. The measurement temperature was room temperature (25° C.), and an AutoPore IV9520 (produced by Shimadzu Corporation, product name) was used for the measurement apparatus.

(7) Bending Resistance Test

A support member provided with an aerogel composite or support member provided with aerogel obtained in each of Examples (except Examples 19 and 20) and Comparative Examples was processed into a piece with a width of 50 mm, and a mandrel test was conducted for the aerogel composite layer side in accordance with JIS K5600-1. A mandrel tester produced by Toyo Seiki Seisaku-sho, Ltd. was used. The presence or absence of generation of a crack and peeling in the aerogel composite layer side or aerogel layer side when the support member provided with an aerogel composite or support member provided with aerogel was bent at 180° with a mandrel radius of 1 mm was visually observed for evaluation. Then, a case that no crack or peeling was generated was rated as "not broken", and a case that a crack or peeling was generated was rated as "broken".

TABLE 4

Support member provided with aerogel composite (support member provided with aerogel)

| | Film support member Bending resistance test | Sheet support member Bending resistance test | Foil support member Bending resistance test | Porous support member Bending resistance test |
|---|---|---|---|---|
| Example 1 | not broken | not broken | not broken | not broken |
| Example 2 | not broken | not broken | not broken | not broken |
| Example 3 | not broken | not broken | not broken | not broken |
| Example 4 | not broken | not broken | not broken | not broken |
| Example 5 | not broken | not broken | not broken | not broken |
| Example 6 | not broken | not broken | not broken | not broken |
| Example 7 | not broken | not broken | not broken | not broken |
| Example 8 | not broken | not broken | not broken | not broken |
| Comparative Example 1 | — | — | — | — |
| Comparative Example 2 | broken | broken | broken | broken |
| Comparative Example 3 | broken | broken | broken | broken |

Table 3 shows that each of the sol compositions in Examples had a sufficient pot life. The table further shows that each of the aerogel composites in Examples had a short gelling time in the step of forming a wet gel and was excellent in reactivity, and had good shrinkage resistance in ambient pressure drying of methanol-displaced gel. The result of the present evaluation that good shrinkage resistance was achieved in any of Examples suggests that an aerogel composite of good quality can be obtained even without performing the substep of solvent displacement.

Further, it can be seen that each of the aerogel composites in Examples has low thermal conductivity and a low compression modulus, and thus is superior with respect to both high thermal insulation and high flexibility. Furthermore,

TABLE 3

| | Sol composition Phase separation after standing | Wet gel Gelling time (min) | Wet gel State of gel after ambient pressure drying of methanol-displaced gel | Aerogel composite (aerogel) Thermal conductivity (W/m · K) | Aerogel composite (aerogel) Compressive modulus (MPa) | Aerogel composite (aerogel) Density (g/cm³) | Aerogel composite (aerogel) Porosity (%) |
|---|---|---|---|---|---|---|---|
| Example 1 | absence | 60 | not shrunk (no crack) | 0.018 | 1.68 | 0.18 | 91.2 |
| Example 2 | absence | 30 | not shrunk (no crack) | 0.030 | 0.42 | 0.19 | 86.4 |
| Example 3 | absence | 30 | not shrunk (no crack) | 0.030 | 0.44 | 0.19 | 85.3 |
| Example 4 | absence | 30 | not shrunk (no crack) | 0.029 | 0.61 | 0.19 | 85.2 |
| Example 5 | absence | 30 | not shrunk (no crack) | 0.028 | 0.55 | 0.19 | 86.2 |
| Example 6 | absence | 60 | not shrunk (no crack) | 0.018 | 1.39 | 0.19 | 90.1 |
| Example 7 | absence | 60 | not shrunk (no crack) | 0.017 | 0.95 | 0.19 | 91.5 |
| Example 8 | absence | 60 | not shrunk (no crack) | 0.030 | 0.43 | 0.19 | 86.7 |
| Comparative Example 1 | presence | — | — | — | — | — | — |
| Comparative Example 2 | absence | 180 | shrunk (with crack) | 0.017 | 7.40 | 0.17 | 91.2 |
| Comparative Example 3 | absence | 180 | shrunk (with crack) | 0.028 | 4.35 | 0.18 | 90.8 |

Table 4 shows that each of the support members provided with an aerogel composite in Examples had good bending resistance.

In contrast, separation was found for the sol composition after standing in Comparative Example 1. In each of Comparative Examples 2 and 3, the gelling time in the step of forming a wet gel was long, and the gel shrunk and a crack was generated in the surface in ambient pressure drying of methanol-displaced gel. Moreover, each support member provided with aerogel was weak against bending, and hence easily broken.

REFERENCE SIGNS LIST

1 . . . aerogel particle
2 . . . silica particle
3 . . . pore
10 . . . aerogel composite
L . . . circumscribed rectangle

The invention claimed is:

1. A sol composition for forming an aerogel composite, the sol composition comprising:
   at least one silicon compound selected from the group consisting of a silicon compound having a hydrolyzable functional group or a condensable functional group and a hydrolysis product of the silicon compound having a hydrolyzable functional group, and at least one polysiloxane compound having a structure represented by the following formula (B):

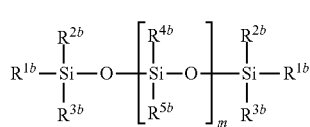

(B)

wherein $R^{1b}$ represents an alkyl group, an alkoxy group, or an aryl group; $R^{2b}$ and $R^{3b}$ each independently represent an alkoxy group; $R^{4b}$ and $R^{5b}$ each independently represent an alkyl group or an aryl group; and m represents an integer of 1 to 50; and
   a silica particle having an average primary particle diameter of 5 to 300 nm, or having a specific surface area of 10 to 600 m²/g.

2. An aerogel composite as a dried product of a wet gel, wherein the wet gel is a condensate of the sol composition according to claim 1.

3. An aerogel composite comprising:
   an aerogel component; and
   a silica particle having an average primary particle diameter of 5 to 300 nm, or having a specific surface area of 10 to 600 m²/g,
   wherein the aerogel composite has a ladder-type structure represented by the following formula (3):

[Chemical Formula 3]

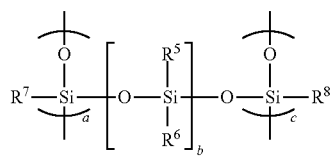

(3)

wherein $R^5$, $R^6$, $R^7$, and $R^8$ each independently represent an alkyl group or an aryl group; a and c each independently represent an integer of 1 to 3000; and b represents an integer of 1 to 50.

4. The aerogel composite according to claim 3, having:
   a three-dimensional network skeleton formed of the aerogel component and the silica particle; and
   a pore.

5. The aerogel composite according to claim 2, wherein the silica particle is an amorphous silica particle.

6. The aerogel composite according to claim 2, having a ladder-type structure including struts and a bridge, wherein the bridge has a structure represented by the following formula (2):

[Chemical Formula 2]

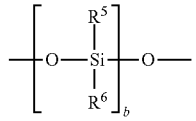

(2)

wherein $R^5$ and $R^6$ each independently represent an alkyl group or an aryl group; and b represents an integer of 1 to 50.

7. The aerogel composite according to claim 6, having a ladder-type structure represented by the following formula (3):

[Chemical Formula 3]

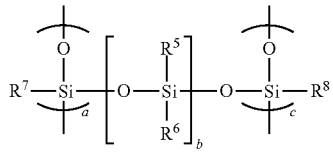

(3)

wherein $R^5$, $R^6$, $R^7$, and $R^8$ each independently represent an alkyl group or an aryl group; a and c each independently represent an integer of 1 to 3000; and b represents an integer of 1 to 50.

8. A support member provided with an aerogel composite, the support member comprising:
   the aerogel composite according to claim 2; and
   a support member supporting the aerogel composite.

9. A heat insulator comprising the aerogel composite according to claim 2.

10. The aerogel composite according to claim 3, wherein the silica particle is an amorphous silica particle.

11. A support member provided with an aerogel composite, the support member comprising:
   the aerogel composite according to claim 3; and
   a support member supporting the aerogel composite.

12. A heat insulator comprising the aerogel composite according to claim 3.

13. The aerogel composite according to claim 3, wherein the silica particle has an average primary particle diameter of 5 to 300 nm and a specific surface area of 10 to 600 m²/g.

14. The aerogel composite according to claim 3, wherein the silica particle has an average primary particle diameter of 7 to 200 nm.

15. The aerogel composite according to claim 3, wherein the silica particle has a specific surface area of 20 to 300 $m^2/g$.

16. The aerogel composite according to claim 3, wherein the silica particle has a specific surface area of 30 to 250 $m^2/g$.

17. The sol composition according to claim 1, wherein the silica particle has an average primary particle diameter of 5 to 300 nm and a specific surface area of 10 to 600 $m^2/g$.

18. The sol composition according to claim 1, wherein the silica particle has an average primary particle diameter of 7 to 200 nm.

19. The sol composition according to claim 1, wherein the silica particle has a specific surface area of 20 to 300 $m^2/g$.

20. The sol composition according to claim 1, wherein the silica particle has a specific surface area of 30 to 250 $m^2/g$.

* * * * *